US007742680B2

(12) United States Patent
Abe et al.

(10) Patent No.: US 7,742,680 B2
(45) Date of Patent: Jun. 22, 2010

(54) APPARATUS AND METHOD FOR PROCESSING SIGNALS

(75) Inventors: Mototsugu Abe, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1010 days.

(21) Appl. No.: 09/840,939

(22) Filed: Apr. 24, 2001

(65) Prior Publication Data

US 2002/0021759 A1  Feb. 21, 2002

(30) Foreign Application Priority Data

Apr. 24, 2000 (JP) ............................. P2000-127658
Oct. 6, 2000 (JP) ............................. P2000-307907

(51) Int. Cl.
*H04N 5/91* (2006.01)
*H04N 5/93* (2006.01)

(52) U.S. Cl. .............................. 386/56; 386/45; 386/46; 386/55

(58) Field of Classification Search .................. 386/56, 386/94, 1, 95–96, 45, 46, 125–126; 725/22, 725/36; 348/571, 907, 922, 722, 2–3; 358/908; 345/719; 360/69
See application file for complete search history.

(56) References Cited

U.S. PATENT DOCUMENTS

| 5,343,251 | A | * | 8/1994 | Nafeh ......................... 348/571 |
| 5,504,518 | A | * | 4/1996 | Ellis et al. ..................... 725/22 |
| 5,576,758 | A | * | 11/1996 | Arai et al. ................. 348/220.1 |
| 5,587,927 | A | * | 12/1996 | Nagao et al. ................. 702/167 |
| 5,621,454 | A |  | 4/1997 | Ellis et al. |
| 5,692,093 | A |  | 11/1997 | Iggulden et al. |
| 6,002,393 | A | * | 12/1999 | Hite et al. .................... 345/719 |
| 6,029,045 | A | * | 2/2000 | Picco et al. ..................... 725/34 |
| 6,100,941 | A | * | 8/2000 | Dimitrova et al. ........... 348/700 |
| 6,128,712 | A | * | 10/2000 | Hunt et al. ................... 711/158 |

(Continued)

FOREIGN PATENT DOCUMENTS

JP  62-098993  5/1987

(Continued)

OTHER PUBLICATIONS

R. Lienhart, et al., "Detection and Recognition of Television Commercials," Handbook of Multimedia Computing, CRC Press, US, 1998, pp. 425-444.

(Continued)

*Primary Examiner*—Jamie J Atala
(74) *Attorney, Agent, or Firm*—Sonnenschein Nath & Rosenthal LLP

(57) ABSTRACT

A tuner 1 receives a TV-broadcast signal from an antenna 6. The TV-broadcast signal is supplied to a demodulator 2. The demodulator 2 demodulates the audio signal and video signal, both contained in the TV-broadcast signal. A CM-detecting section 4 is provided. In the section 4, characteristic patterns are generated at intervals of 15 seconds, 30 seconds and 60 seconds, from the audio and video signals. Then, CM candidates are detected in accordance with the characteristic patterns. Characteristic data representing the characteristics of a CM is extracted from each CM candidate or the audio and video signals preceding and following the CM candidate. The section 4 detects a CM from the characteristic data thus extracted.

53 Claims, 22 Drawing Sheets

ADJACENT-CANDIDATE PRIORITY RULE

U.S. PATENT DOCUMENTS

| | | |
|---|---|---|
| 6,226,444 B1 * | 5/2001 | Goldschmidt Iki et al. .... 386/83 |
| 6,278,836 B1 * | 8/2001 | Kawara et al. ................ 386/94 |
| 6,671,880 B2 * | 12/2003 | Shah-Nazaroff et al. ...... 725/22 |
| 6,718,121 B1 * | 4/2004 | Shikunami .................. 386/109 |

FOREIGN PATENT DOCUMENTS

| | | |
|---|---|---|
| JP | 05-028717 | 2/1993 |
| JP | 06-303591 | 10/1994 |
| JP | 09-307841 | 11/1997 |
| JP | 09-312827 | 12/1997 |
| JP | 10-215436 | 8/1998 |
| JP | 10-222933 | 8/1998 |
| JP | 10-224722 | 8/1998 |
| JP | 11-053783 | 2/1999 |
| JP | 11-069322 | 3/1999 |

OTHER PUBLICATIONS

Z. Liu, et al., "Audio Feature Extraction and Analysis for Scene Segmentation and Classification," Journal of VLSI Signal Processing Systems for Signal, Image, and Video Technology, Kluwer Academic Publishers, Dordrecht, NL, vol. 20, No. ½, Oct. 1992, pp. 61-78.

* cited by examiner

| ITEM | SYMBOL | UNIT | EXAMPLE OF NECESSARY CONDITION (19a) | EXAMPLE OF NECESSARY CONDITION (20a) | EXAMPLE OF CONDITION DETERMINED (21a) |
|---|---|---|---|---|---|
| START TIME | $T_s$ | hr, min., sec. | 1:23'45 | 1:23'45 | 1:23'45 |
| LENGTH (SOUND) | $T_w$ | sec. | 14.63 | 14.63 | 14.63 |
| PRE-BREAK LENGTH | $Q_1$ | ms | - | 300.0 | 300.0 |
| POST-BREAK LENGTH | $Q_2$ | ms | - | 300.0 | 300.0 |
| MINIMUM WIDTH OF PRE-BREAK | $Q_3$ | (See note) | - | 0.00015 | 0.00015 |
| MINIMUM WIDTH OF POST-BREAK | $Q_4$ | (See note) | - | 0.00020 | 0.00020 |
| LEFT-RIGHT CORRELATION | $Q_5$ | - | - | 0.934 | 0.934 |
| MEAN AMPLITUDE | $Q_6$ | (See note) | - | 0.010 | 0.010 |
| NUMBER OF CUTS | $Q_7$ | piece | - | 9 | 9 |
| BROADCAST MODE | $Q_8$ | - | - | 1 | 1 |
| NUMBER OF ADJACENT CANDIDATES | $Q_9$ | piece | - | 2 | 2 |
| ENERGY OF PRE-SPECTRUM DIFFERENCE | $Q_{10}$ | - | - | 0.41 | 0.41 |
| ENERGY OF POST-SPECTRUM DIFFERENCE | $Q_{11}$ | - | - | 0.63 | 0.63 |
| SCORE | R | - | - | - | 1.80 |
| SCORE | Z | - | - | - | 1 |

*note: amount of the amplitude of the audio signal is represented as the proportion to the maximum amplitude

FIG.7

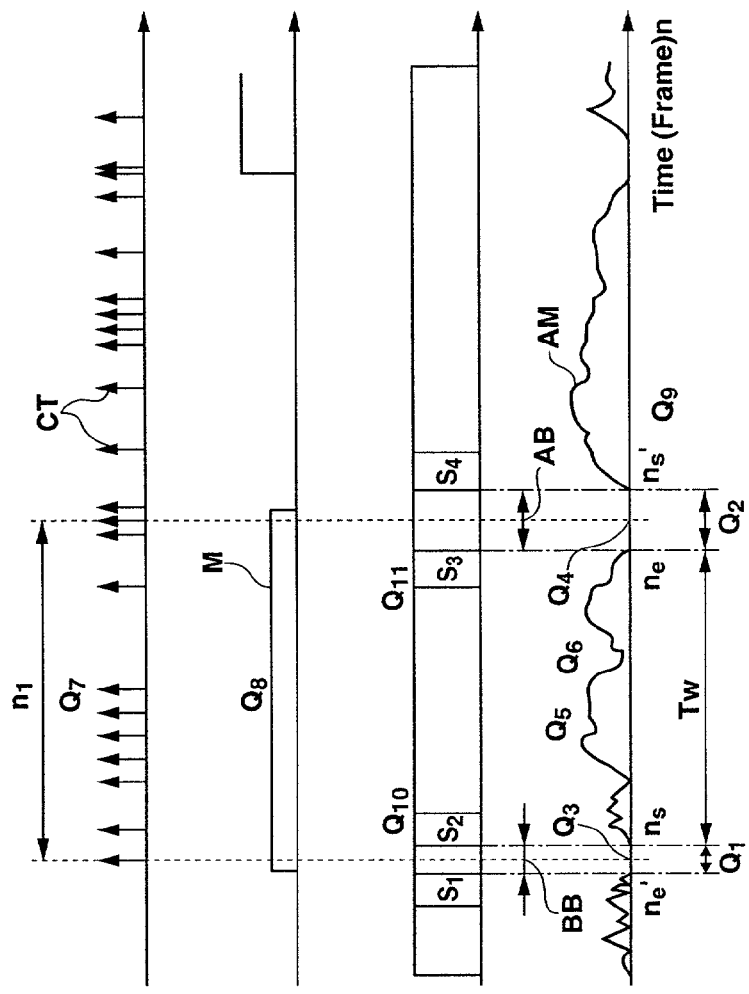

ADDITIONAL CONDITION ANALYZER 21

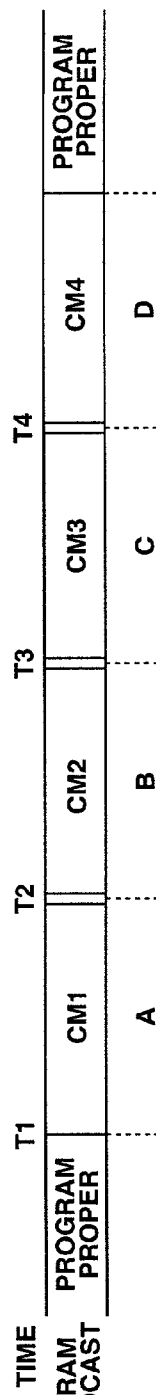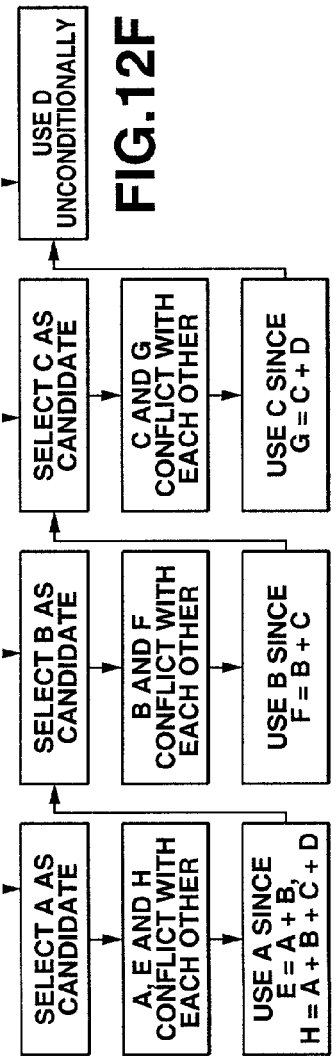
FIG.12A PROGRAM BROADCAST
FIG.12B LATEST CM CANDIDATE
FIG.12C
FIG.12D
FIG.12E
FIG.12F
MINIMUM-LENGTH PRIORITY RULE

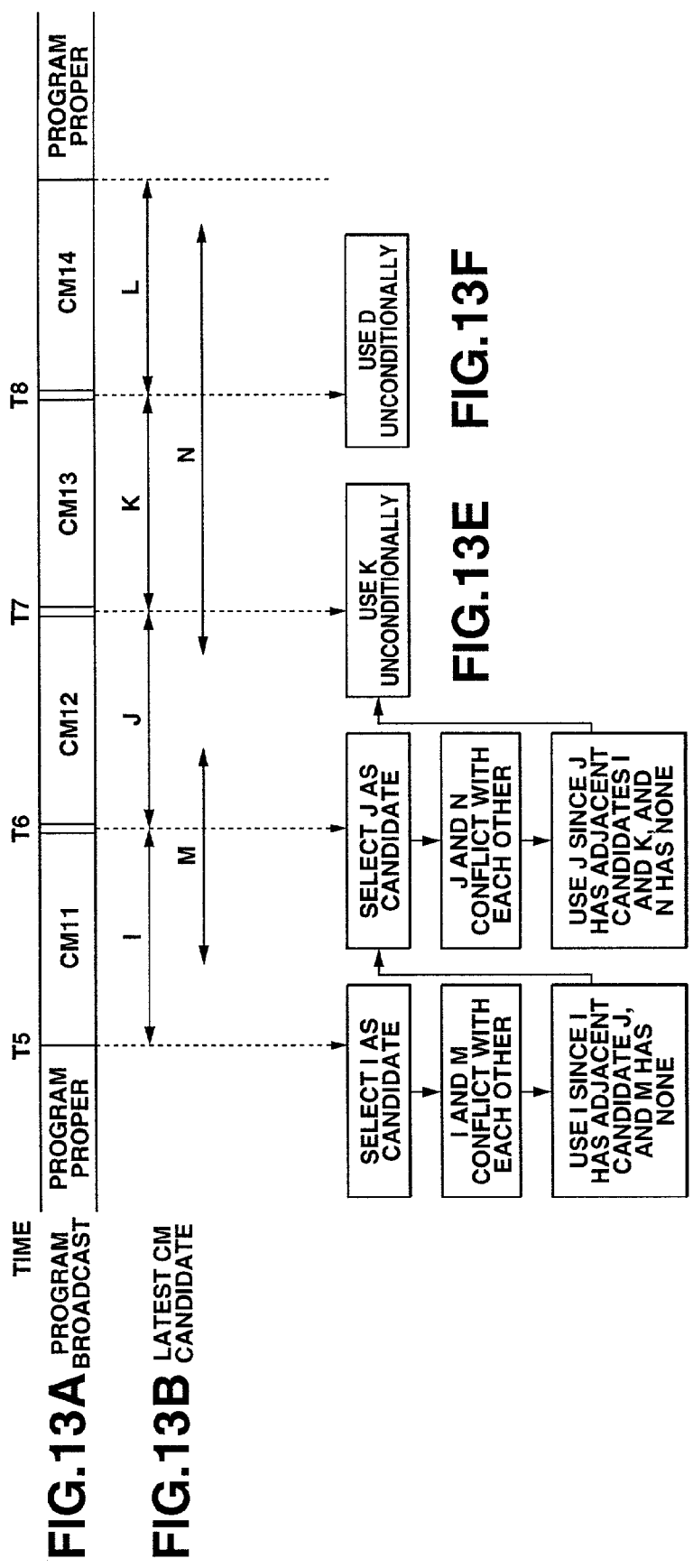

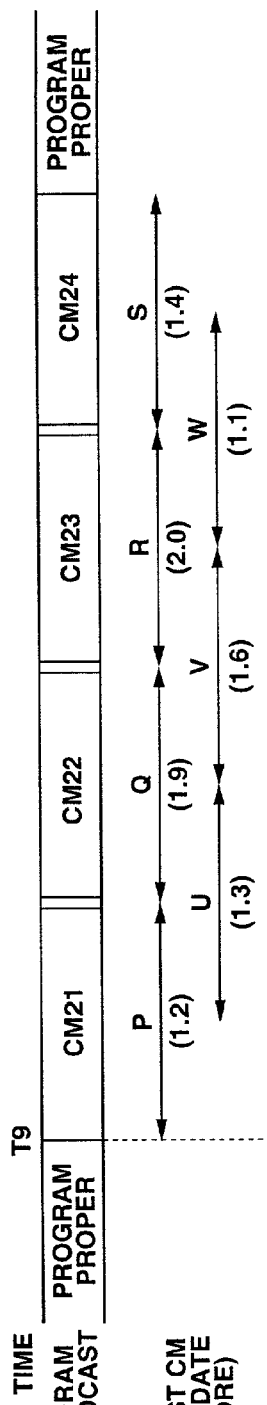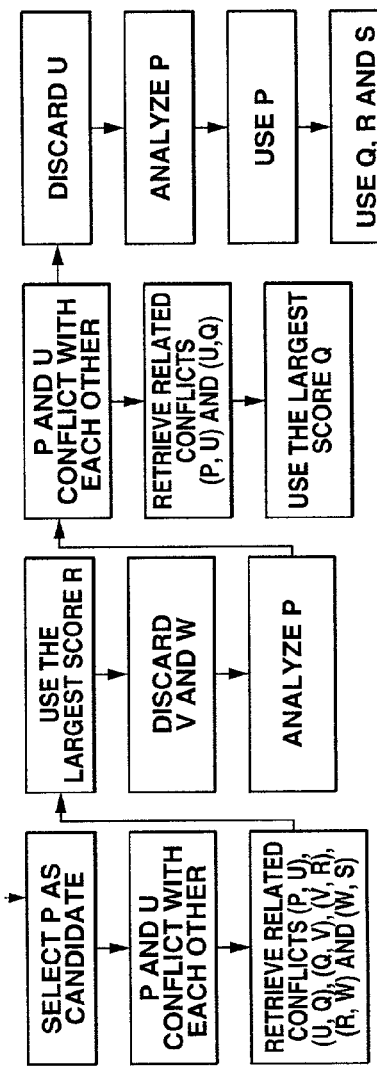
FIG.14A PROGRAM BROADCAST
FIG.14B LATEST CM CANDIDATE (SCORE)
FIG.14C FIG.14D FIG.14E FIG.14F
SCORE PRIORITY RULE

FIG.16

| ITEM | SYMBOL | UNIT | EXAMPLE OF NECESSARY CONDITION (19a) | EXAMPLE OF ADDITIONAL CONDITION (20a) | EXAMPLE OF CONDITION DETERMINED (21a) |
|---|---|---|---|---|---|
| SOUND CONTAINED ? | $Q_{12}$ | - | - | 1 | 1 |
| MUSIC CONTAINED ? | $Q_{13}$ | - | - | 1 | 1 |
| PROBABILITY FOR TIME ZONE | $Q_{14}$ | - | - | 0.15 | 0.15 |
| PROBABILITY FOR PROGRAM TYPE | $Q_{15}$ | - | - | 0.1 | 0.1 |

FIG.17

| ITEM | SYMBOL | UNIT | EXAMPLE OF VALUE |
|---|---|---|---|
| NUMBER OF SMALL AMPLITUDES | $Q_{16}$ | - | 1 |
| SMALL-AMPLITUDE PERIOD | $Q_{17}$ | s | 0.24 |
| SIGNAL DISPERSION | $Q_{18}$ | - | 0.40 |

SUM OF SMALL-AMPLITUDE PERIOD (IN CM PART)

SUM OF SMALL-AMPLITUDE PERIOD (IN NON-CM PART)

DISPERSION OF AMPLITUDE (IN CM PART)

DISPERSION OF AMPLITUDE (IN NON-CM PART)

APPARATUS AND METHOD FOR PROCESSING SIGNALS

RELATED APPLICATION DATA

The present application claims priority to Japanese Applications Nos. P2000-126557 filed Apr. 24, 2000, and P2000-307907 filed Oct. 6, 2000, which applications are incorporated herein by reference to the extent permitted by law.

BACKGROUND OF THE INVENTION

The present invention relates to an apparatus and method for processing signals. More particularly, the invention relates to an apparatus and method for processing signals, which can automatically detect or retrieve commercial messages added to TV-broadcast programs.

Generally, each of sponsored TV-broadcast programs consists of a program proper and sponsor's commercial messages inserted in the program proper. (Hereinafter, the commercial messages will be referred to as "CMs," for the sake of brevity.)

Television viewers are interested mainly in the program proper. Most of them wish not to see the CMs inserted in the program proper.

On the other hand, some viewers may sometimes want to see CMs, particularly those which tell stories and those in which famous actors and/actresses make appearances.

A sponsored TV-broadcast program may be recorded on a recording medium such as a magnetic tape or a magnetic disc. If the program proper and CM constituting the recorded program can be independently reproduced from the recording medium, it will satisfy not only people who wish to enjoy seeing the program proper only, but also people who want to see the CM only.

As a technique of reproducing the TV program proper only, skipping the CM, is known. This technique, called "CM-skipping function (CM-skipping function in broad sense)," is incorporated many types of home-use video tape recorders.

Four types of CM-skipping functions (CM-skipping functions in broad sense) are available. They are: CM fast-forward function, CM cutting fiction, CM-skipping fiction based on the broadcast mode, and CM-skipping function not based on the broadcast mode. Of these four types, the CM fast-forward fiction is implemented by utilizing the fact that CMs are produced in Japan, usually in units of 15 seconds. While seeing the recorded TV program, the viewer may push one time the CM-skip button on the remote controller, fast running that 15-second CM part of the tape and thus skipping the CM. If he pushed the button twice, then CM part (30 seconds) of the tape is fed fast forward and thus skipped. This technique of fast feeding the tape forwards is disclosed in, for example, Jpn. Pat. Appln. Laid-Open Publication No. 10-269651. Further, Jpn. Pat. Appln. Laid-Open Publication No. 9-307841 discloses the technique of determining the end of fast feeding of tape upon detecting a black frame of the video signal and the no-sound part of the audio signal are both longer than a predetermined length, not upon lapse of the predetermined time as in the technique of fast feeding the tape forwards.

The CM cutting function is achieved by using the fact that CMs are broadcast often with stereophonic sound in Japan and a pilot signal is multiplexed on the TV-broadcast signal, indicating that the audio signal is in monaural mode, stereophonic mode or sound-multiplex mode. To record a TV-broadcast program proper with sound of, for example, the monaural mode or sound-multiplex mode, the recording is interrupted for any stereophonic part (CM-recorded part) of the tape. Thus, the CM-recorded part of the tape is, so to speak, cut. The technique of cutting the CM part is disclosed in, for example, Jpn. Pat. Appln. Laid-Open Publication No. 3-158086 and Jpn. Pat. Appln Laid-Open Publication No. 3-2622872.

Like the CM cutting function, the CM-skipping function based on the broadcast mode (CM-skipping function in narrow sense) is implemented since the CM is different from the program proper in terms of broadcast mode. In the CM cutting function, the CM is cut while the program is being recorded as described above. In the CM-skipping function based on the broadcast mode, the broadcast mode is recorded on the tape, as well as all images and sound, and any stereophonic part (CM-recorded part) of the tape is fed fast forward in the course of reproducing the entire program recorded on the tape. The technique of skipping a CM based on the broadcast mode is disclosed in, for example, Jpn. Pat. Appln. Laid-Open Publication No. 5-250762.

The CM-skipping fruition not based on the broadcast mode (CM-skipping function in narrow sense) is effected in accordance with the period in which a no-sound part exists in the audio signal, in which an image-changing part (where the image changes to another) exists in the video signal, or in which black level and white level appear in the broadcast signal. Any part of the tape, where the period is a multiple of 15 seconds is regarded as a CM-recorded part and is fed fast forward. The CM-skipping function not based on the broadcast mode is disclosed in, for example, Jpn. Pat. Appln. Laid-Open Publication No. 8-317342 and "A Study on the System for Detecting CMs in TV Broadcast Programs" (a technical report of Video Information Media Association, VIR97-22, 19/23, 1997).

The CM-skipping functions described above are performed by the TV viewers who operate home-use video tape recorders to record and playback TV-broadcast programs. The TV viewers need to determine whether this or that particular part of a program is a CM or not. The CM-skipping functions cannot automatically detect CM parts of the TV-broadcast program.

In the CM-skipping fiction based on the broadcast mode or the CM-skipping function (in the narrow sense), CMs are detected from the mode in which they are broadcast, e.g., the stereophonic mode. This function does not work in the case where the program proper is broadcast in the stereophonic mode. Nor does it work in the case where the CM is broadcast in the monaural mode or sound-multiplex mode. (Namely, the CM cannot be cut or skipped at all.)

In the CM-skipping function not based on the broadcast mode or the CM-skipping function (in the narrow sense), CMs can be detected without bothering the TV viewer or determining the broadcasting mode of the CMs. This function detects a CM by determining whether a period in which a no-sound part exists in the audio signal or an image-changing part (where the image changes to another) exists in the video signal coincides with a preset value or not. In the TV programs actually broadcast, however, the no-sound part may be shortened to adjust the time of the TV program or by switching operation. Hence, the no-sound part thus shortened may coincide with the preset value. In addition, the program proper may include a no-sound part or an image-changing part that coincides with the preset value. Thus, any CM having a no-sound part shorter than the preset value cannot be detected at all, and any no-sound part or any image-changing part in the program proper, which coincides with the preset value, may be detected as a CM.

A plurality of CMs may be broadcast continuously in a TV program. In this case, the four functions described above can detect the period in which the CMs are so broadcast, but cannot detect the period of each CM cannot. It is therefore impossible for the TV viewer to extract and enjoy any one of such CMs.

It is therefore desired that CMs be detected and retrieved with high reliability, from the TV broadcast signals.

SUMMARY OF THE INVENTION

The present invention has been made in consideration of the forgoing. An object of the invention is to provide an apparatus and method for processing signals, which can accurately detect or retrieve, for example, the commercial messages included in TV-broadcast signals.

A signal-processing apparatus according to the present invention comprises: candidate-detecting means for receiving an input signal including at least the first signal part and remaining signal parts in time-divided fashion, and for detecting, from the input signal, a candidate part of the first signal part in accordance with characteristic patterns of the input signal at prescribed time intervals; characteristic-extracting means for extracting characteristic data indicating the probability of the first signal part from the candidate of the signal part or from signal parts preceding and following the candidate part; and detecting means for detecting the first signal part, in accordance with the characteristic data extracted by the characteristic-extracting means. Having these components, the apparatus achieves the object mentioned above. That is, it can accurately detect or retrieve, for example, the commercial messages included in TV-broadcast signals.

The detecting means may have characteristic-evaluating means for evaluating the possibility that the candidate part is the first signal part, on the basis of the characteristic data, and determining means for determining the first signal part from the result of evaluation performed by the characteristic-evaluating means. Alternatively, the detecting means may have determining means for determining, from the characteristic data, that the candidate of the signal part is identical to a signal part of the first type that has been designated.

A signal-processing method according to the invention comprises: receiving an input signal including at least the first signal part and remaining signal parts in time-divided fashion, and detecting, from the input signal, a candidate part of the first signal part, in accordance with characteristic patterns of the input signal at prescribed time intervals; extracting characteristic data indicating the probability of the first signal part, from the candidate part or from signal parts preceding and following the candidate part; and detecting the first signal part, in accordance with the characteristic data that has been extracted. Comprising these steps, the method achieves the above-mentioned object. That is, it can accurately detect or retrieve, for example, the commercial messages included in TV-broadcast signals.

In the method, the possibility that the candidate part is the first signal part is evaluated on the basis of the characteristic data, in order to detect the first signal part and the first signal part is determined from the result of evaluating the possibility. Alternatively, from the characteristic data it is determined that the signal in the candidate part is identical to the first signal part which has been designated, Namely, in the present invention, CM candidates, each having a specific pattern, are extracted from the audio signal and/or video signal contained in a TV-broadcast signal composed of a program proper and commercial message signals, in accordance with prescribed necessary conditions. Additional conditions that characterize the CM candidates are extracted. From the additional conditions thus extracted it is determined whether each CM candidate is a CM or not., Any CM can therefore be detected with high accuracy. In the invention, all or some of the additional conditions are recorded and compared so that they may be compared with the TV-broadcast signal or any recorded CM candidate. The CM candidates can, therefore retrieved from the TV-broadcast signal or the database containing the TV-broadcast signal.

In the apparatus and method of processing signals, both according to the present invention, a candidate part of the first signal part is detected from the input signal, in accordance with characteristic patterns existing in the input signal at prescribed time intervals. The data representing the characteristics of the first signal part is extracted from the candidate part or from signal parts preceding and following the candidate part. The first signal part is then detected in accordance with the characteristic data that has been extracted. Hence, the apparatus and method can detect or retrieve any commercial message contained in a TV-broadcast signal.

BRIEF DESCRIPTION OF THE DRAWING

FIG. 7 is a table showing the CM candidates the CM-candidate detector has detected;

FIGS. 8A to 8D are a timing chart explaining how the additional condition calculator provided in the CM-detecting section obtains characteristic of an audio signal;

FIG. 12 is a diagram explaining the minimum-length priority rule;

FIG. 13 is a diagram illustrating the adjacent-candidate priority rule;

FIG. 14 is a diagram explaining the score priority rule;

FIG. 16 shows the extended part of the CM-candidate table provided in the CM-detecting section, i.e., the second embodiment of the invention;

FIG. 17 shows the extended part of the CM-candidate table provided in a CM-detecting section that is the third embodiment of this invention;

DETAILED DESCRIPTION OF THE INVENTION

Figure 1:
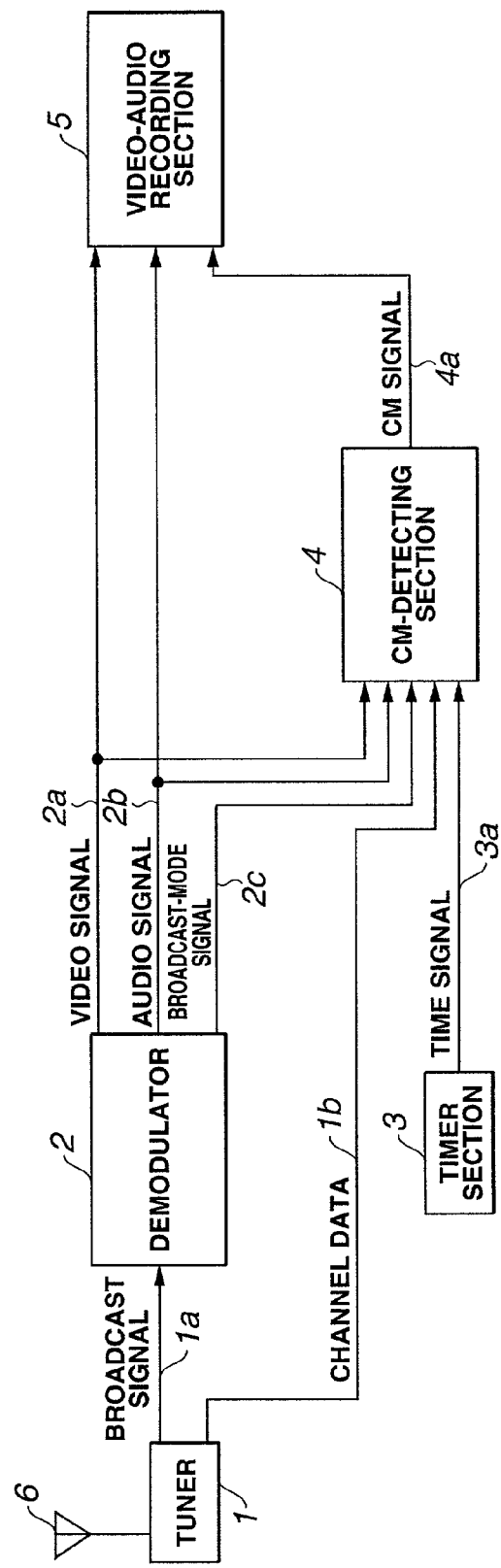
FIG. 1 is a block diagram showing a video-audio recorder that incorporates the first embodiment of the present invention.

Preferred embodiments of the present invention will be described, with reference to the accompanying drawings.

Before describing the embodiments of the invention, the principle of detecting a CM part from a TV-broadcast signal in the present invention will be explained.

Most of CMs to broadcast by television are produced in accordance with the standards designated by the TV broadcasting company. Therefore, the CMs are broadcast in one of the few periods prescribed by the company. In Japan, for example, CMs are broadcast in one of only three periods, i.e., a 15-second period, a 30-second period and a 50-second period, except for special cases.

To broadcast a CM, the CM is inserted into a TV broadcast stream, along with the program proper and other CMs. The audio level (i.e., sound volume) therefore falls and the video signal is switched immediately before and after each CM contained in the TV broadcast steam. The falling of the audio level does not always mean that the audio level falls to the no-sound level (i.e., a low-noise level). This is because the audio level may not fall to the completely no-sound level when the TV program is switched from the program proper to the CM, or vice versa.

Almost all CMs inserted in TV broadcast streams have three characterizing features. First, they last for a prescribed time (only a few CM periods are prescribed). Second, the audio level falls immediately before and-after the CM. Third, the image is switched to another immediately before and after the CM. Hereinafter, the signal features most CMs have will be called "characteristic patterns," and the conditions for detecting the characteristic patterns will be referred to as "necessary conditions."

If that part of a TV signal which corresponds to the necessary conditions is detected, any and very CM candidate (i.e., a part of the TV signal, which probably represents a CM) can be detected very reliably, almost without fail. However, many parts of the program proper may happen to satisfy the necessary conditions. Such parts of the program proper may be detected, erroneously as CM candidates.

Many CMs, not most CMs, are characterized in the following respects, apart from the necessary conditions described above:

1. The audio level falls from the normal level in many cases, immediately before and after at the start and end of the CM. (That is, the audio level falls immediately before the start of the CM and immediately after the CM or immediately before the re-start of the program proper.)

2. A no-sound part lasts for hundreds of milliseconds in most cases, between a CM and the program proper and/or between a CM and the next CM.

3. The sound parts of the TV-broadcast program are hundreds of milliseconds shorter, in many cases, than the prescribed CM periods (15 seconds, 30 seconds, and 60 seconds), and are scarcely shorter than the CM periods by one second or more.

4 The left-channel (L-channel) and right-channel (R-channel) levels of a stereophonic audio signal have a correlation value less than 1 in many cases.

5. The sound volume of CMs is somewhat larger than that of the program proper.

6. CMs are broadcast in stereophonic mode in many cases.

7. Two or more CMs are often broadcast continuously during a CM period.

8. Scenes are switched frequently in many cases during a CM period.

9. Conversely, scenes are switched only a few times during a CM period (in the case where a still picture, for example, is broadcast).

10. The sound volume greatly changes in many cases at the junction between the program proper and the junction between a CM and the next CM.

11. Most CMs are featured with both sound and music.

12. CMs are likely to be broadcast at each hour, in accordance with the program-edition scheme.

13. CMs are likely to be broadcast at each half-hour, also in accordance with the program-edition scheme.

14. Many CMs are broadcast at a time, in a specific time zone of a TV program (e.g., in the half-time period of a football game being live-broadcast).

Hereinafter, the features (1) to (14) that most CMs have will be referred to as "additional conditions." The additional conditions derives from the prescribed standard in accordance with which CMs are produced, the advertisement which the CMs must achieve within a short time, and the program-edition scheme based on which the CMs are produced. The additional conditions are mirrored in the TV-broadcast signal. Although the additional conditions are not so reliable as to detect CMs without fail, they are useful to determine whether a particular part of a TV-broadcast program is a CM or not.

TV broadcasting is characterized in that a plurality of video signals and a plurality of audio signals cannot be broadcast in the same channel at the same time. If image parts and sound parts, each satisfying the additional conditions, overlapped one another in a TV-broadcast signal, two or more parts (CM candidates) might be detected in the TV-broadcast signal that seems to be CMs. Should it be so, only one of such parts can be a CM part; the other parts cannot be CM parts. Any condition defined by this characterizing aspect of TV broadcasting shall be referred to as "logic condition" hereinafter.

In the present invention, the necessary conditions, logic conditions and additional conditions, all defined above, are used rationally and effectively. This makes it possible to detect CMs from a TV-broadcast signal with high accuracy.

More specifically, the following steps are performed in the present invention, to detect CMs accurately. First, CM candidates (signal parts that seems to be CMs) are extracted from the TV-broadcast signal. Then, one of the CM candidates is selected, which satisfies the additional conditions and which is statistically regarded as the most prominent candidate.

Finally, the CM candidate thus selected is made no longer overlap any other CM candidates, by applying the logic conditions to this CM candidate.

FIG. 1 shows a video-audio recorder according to the first embodiment of the invention, which can detects CMs from TV-broadcast signals.

The video-audio recorder has the structure shown in FIG. 1. In the video-audio recorder, the tuner 1 receives TV-broadcast signals of various channels from an antenna 6 and selects the TV-broadcast signal of one channel. The TV-broadcast signal selected is supplied, as broadcast signal 1a to the demodulator 2.

The demodulator 2 determines the broadcast mode (i.e., monaural mode, stereophonic mode, or sound-multiplex mode) in which the broadcast signal 1a is input to it, from the modulation frequency of the pilot signal contained in the broadcast signal 1a. The demodulator 2 modulates the video signal 2a and audio signal 2b that are contained in the broadcast signal 1a. At this time, the audio modulation signal is modulated in accordance with the broadcast mode. The video signal 2a and audio signal 2b, both modulated, and a broadcast-mode signal 2c are input to the CM-detecting section 4. The video signal 2a and audio signal 2b are also supplied to the video-audio recording section 5.

The video-audio recording section 5 uses a recording medium such as a magnetic tape, a magnetic disc, an optical disc, or a magneto-optical disc. The section 5 is an apparatus that can record the video signal 2a and the audio signal 2b on the recording medium. The video-audio recording section 5 encodes and compresses the. video signal and audio signal and records these signals on the recording medium. Alternatively, the section 5 may be an apparatus that decodes and expands the video signal and audio signal, reproducing them from the recording medium., The video-audio recorder timer comprises a timer section 3. The timer section generates a time signal 3a. The time signal 3a is supplied to the CM-detecting section 4.

The CM-detecting section 4 characterizes the invention and is the main component of the video-audio recorder. The section 4 receives the video signal 2a, audio signal 2b and broadcast-mode signal 2c from the demodulator 2 and the timer signal 3a from the timer section 3. As will be described in greater detail, the section 4 detects CM parts of the video and audio signals contained in the broadcast signal 1a and outputs a CM signal 4a that represents the start time of a CM and the period of the CM. The CM signal 4a is supplied to the video-audio recording section 5. The section 5 records the CM signal 4a on the recording medium, together with the video signal 2a and the audio signal 2b.

In the meantime, the tuner 1 generates channel data 1b representing the broadcast channel selected. The channel data 1b is supplied to the CM-detecting section 4. The section 4 determines, from the channel data 1b, whether or not the channel selected is one through which no CMs are broadcast. If the section 4 determines from the channel data 1b that the tuner 1 has selected a channel through which no CMs are broadcast, it does nothing to detect CMs. Namely, the CM-detecting section 4. determines whether it should detect CMs or not, in accordance with the channel data 1b. Alternatively, the tuner 1 may control the section 4 in accordance with the channel data 1b, causing the section 4 to detect CMs or prohibiting the-section 4 from detecting CMs.

Of the components of the recorder, the tuner 1, the demodulator 2, timer section 3 and the video-audio recording section 5 are similar to those that are incorporated in the video tape recorders or the like which are well known at present Therefore, only the CM-detecting section 4 will be described in detail.

Figure 2:
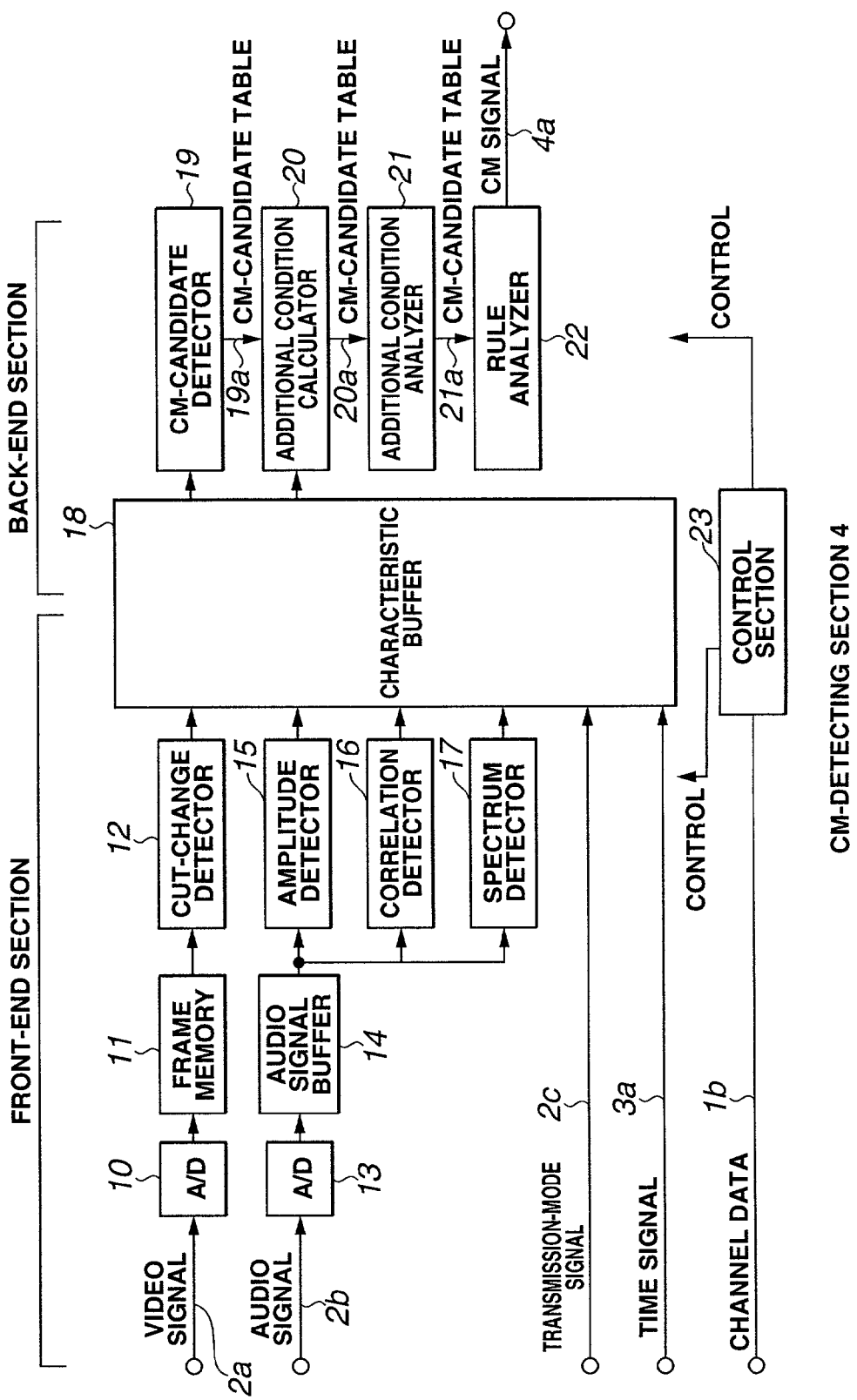
FIG. 2 is a block diagram depicting the CM-detecting section incorporated in the video-audio recorder, which is the first embodiment of the invention.

FIG. 2 illustrates the CM-detecting section 4 that is the first embodiment of the present invention. In FIG. 2, the signals identical to those shown in FIG. 1 are designated at the same reference symbols. The CM-detecting section 4 comprises two sections, i.e., a front-end section and a back-end section. The section 4 has a control section 23. The control section 23 receives the channel data 1b from the tuner 1 and determines from the data 1b whether or not the channel selected is one through which no CMs are broadcast. The section 23 controls other components of the CM-detecting section 4 based on whether the channel selected is such a channel or not, so that the other components of the section 4 may not operate to detect CMs.

First, the front-end section shown will be described with reference to FIG. 2.

As illustrated in FIG. 2, the A/D converter 10 receives a video signal 2a from the demodulator 2 (FIG. 1) and converts the same to a digital video signal. The digital video signal is stored into the frame memory 11. The frame memory 11 can store at least two. frame-data items A one-frame video signal read from the frame memory 11 is supplied to the cut-change detector 12.

The cut-change detector 12 detects, based on the one-frame video signal, any frame data representing an abrupt change in an image and any frame having uniform luminance. (Hereinafter, the first-mentioned frame data will be called "image-changed frame," and the second-mentioned frame data will be called "uniform-luminance frame.")

More precisely, the cut-change detector 12 finds a square sum of the differences in luminance between the corresponding pixels of any, two adjacent image frames represented by the two one-frame video signals stored in the frame memory 11. If the square sum exceeds a predetermined threshold value, the cut-change detector 12 detects the second of the two adjacent frames as an image-changed frame. The cut-change detector 12 determines the luminance dispersion in each frame image. If the luminance dispersion is less than a predetermined threshold value, the detector 12 detects the frame as a uniform-luminance frame. The frame intervals (about 30 nm in the NTSC system) may coincide with the frame cycle that will be described later in conjunction with the processing of audio signals. If so, the frame intervals are increased to coincides with the frame cycle.

How the cut-change detector 12 detects an image-changed frame and a uniform-luminance frame will be described below in greater detail.

The square sum. D[n] of the luminance differences between the pixels of the nth frame and the (n-1)th frame can be obtained by the following equation (1), and the luminance dispersion V[n] of the nth frame can be given by the following equation (2):

$$D[n] = \sum_{x=0}^{X-1}\sum_{y=0}^{Y-1}(I_n(x, y) - I_{n-1}(x, y))^2 \tag{1}$$

$$V[n] = \frac{1}{XY}\sum_{x=0}^{X-1}\sum_{y=0}^{Y-1}I_n^2(x, y) - \left(\frac{1}{XY}\sum_{x=0}^{X-1}\sum_{y=0}^{Y-1}I_n(x, y)\right)^2 \tag{2}$$

where X is the horizontal size of the discrete video signal, Y is the vertical size thereof, $I_n(x, y)$ is the image of the nth frame, and $I_{n-1}(x, y)$ is the image of the (n-1)th frame. Note that x and y are the serial numbers of each pixel with respect to vertical and horizontal directions.

The detection output C[n] of the cut-change detector 12 is expressed by the following equation (3):

$$C[n] = \begin{cases} 1 (D[n] \geq D_{thsd} \text{ or } V[n] \leq V_{thsd}) \\ 0 (D[n] < D_{thsd} \text{ and } V[n] > V_{thsd}) \end{cases} \quad (3)$$

where $D_{thsd}$ is the predetermined threshold value of the square sum applied to detect the image-changed frame, and $V_{thsd}$ is the predetermined threshold value of the luminance dispersion applied to detect the uniform-luminance frame.

The detection output C[n] of the cut-change detector 12 is supplied to the characteristic buffer 18. Note that the output C[n] represents the characteristics of the video signal.

In order to obtain the differences in luminance between the corresponding pixels of any two adjacent image frames, it is necessary to use a memory that can store two frames-data items. For the same purpose, two frame-data items must be processed. To reduce the storage capacity of the memory and the amount of data to be processed, various measures may be taken. For example, each frame-data item may be divided into small blocks and the luminance difference may be calculated for each small block, instead of processing the frame-data item. Alternatively, a luminance histogram is obtained for each frame-data item, not the luminance differences between the pixels of two adjacent image frames, and then the luminance difference between the two frame-data items from the luminance histogram. Still alternatively, an average luminance may be calculated of each frame-data item, and the difference between the average luminance of the two frame data items may then be obtained. If the memory have a storage capacity larger than is necessary to two frames of image data, luminance differences or color histogram differences may be calculated for the R (red), G (green) and B (blue) components of a color image. In this case, the cut-change detector 12 can detect the image-changed frame and the uniform-luminance frame with higher accuracy.

As shown in FIG. 2, the CM-detecting section 4 comprises an A/D converter 13, an audio signal buffer 14, an amplitude detector 15, a correlation detector 16, and a spectrum detector 17. The A/D converter 13 receives the audio signal 2b from the demodulator 2 (FIG. 1) and converts the same to a digital audio signal. The audio signal buffer 14 stores the digital audio signal. The buffer 14 is a memory that can store left (L)-channel and right (R)-channel stereophonic audio signals for at least a prescribed time $T_1$ (e.g., 30 ms or less, which will be referred to as "one-frame length"). The audio signal read from the audio signal buffer 14 is supplied to the amplitude detector 15, correlation detector 16 and spectrum detector 17.

The amplitude detector 15 detects an mean square of amplitude that the audio signals stored in the buffer 14 have for a predetermined time $T_2$ (e.g., 15 ms or less, which will be referred to as "one-frame cycle"). That is, the amplitude detector 15 detects the mean square of amplitude at intervals of time $T_2$, from the stereophonic audio signals $S_L[m]$ and $S_R[m]$ read from the audio signal buffer 14 for the left-channel and right-channel, respectively. The letter "m" in $S_L[m]$ and $S_R[m]$ is the number of a sample stored in the buffer 14, which represents the time by which the sample is separated from the first sample. The value of "m" ranges from 0 to M-1 (m=0, . . . , M-1). The greatest value M for "m" corresponds to the one-frame length $T_1$.

To state more specifically, the amplitude detector 15 finds the mean square A[n] of amplitude of the left- and right-channel audio signals by applying the following equation (4). In other words, the mean square of amplitude is calculated for each half (½) frame (15 ms). Moreover, the mean square of amplitude of 15-ms frames is calculated for one frame (30 ms). Thus, the amplitude detector 15 generates the mean square of amplitude of the frame is obtained.

$$A[n] = \frac{1}{4M} \sum_{m=0}^{M-1} (S_L[m+nT_2] + S_R[m+nT_2])^2 \quad (4)$$

The mean square A[n] of amplitude, i.e., the output of the amplitude detector 15, is supplied to the characteristic buffer 18. The characteristic buffer 18 stores the mean square A[n] that represents one of the characteristics of the audio signal.

The correlation detector 16 receives the audio signal stored in the audio signal buffer 14. From the two frames the detector 16 detects the correlation coefficients the audio signal had for each frame before it has been normalized. The detector 16 also detects the short-period energy that will be later used to normalize the audio signal again. Assume that the audio signal buffer 14 stores a left-channel stereophonic audio signal $S_L[m]$ and a right-channel stereophonic audio signal $S_R[m]$. If this is the case, the correlation detector 16 detects, from the audio signals $S_L[m]$ and $S_R[m]$, the correlation coefficients that the signals $S_L[m]$ and $S_R[m]$ had before they have been normalized, and detects the short-period energy that will be used to normalize these signals $S_L[m]$ and $S_R[m]$ again.

More precisely, the correlation detector calculates the correlation coefficient $A_{LR}[n]$ for the left- and right-channel audio signals $S_L[m]$ and $S_R[m]$ contained in the nth frame, the energy $A_{LL}[n]$ of the left-channel audio signal and the energy $A_{RR}[n]$ of the right-channel audio signal, by using the following equations (5), (6) and (7), respectively.

$$A_{LR}[n] = \sum_{m=0}^{M-1} S_L[m+nT_2] S_R[m+nT_2] \quad (5)$$

$$A_{LL}[n] = \sum_{m=0}^{M-1} S_L^2[m+nT_2] \quad (6)$$

$$A_{RR}[n] = \sum_{m=0}^{M-1} S_R^2[m+nT_2] \quad (7)$$

The correlation coefficient $A_{LR}[n]$, the energy $A_{LL}[n]$ and the energy $A_{RR}[n]$, all output from the correlation detector 16, are supplied to the characteristic buffer 18, as data that represents one characteristic of the audio signal.

The spectrum detector 17 receives the audio signal stored in the audio signal buffer 14 and calculates the short-period spectrum of the audio signal. Assume that the audio signal buffer 14 stores a left-channel stereophonic audio signal $S_L[m]$ and a right-channel stereophonic audio signal $S_R[m]$. In this case, the spectrum detector 17 calculates, from the audio signals $S_L[m]$ and $S_R[m]$, the short-period spectrum of the audio signal.

To state it more specifically, the spectrum detector 17 obtains the discrete spectrum F[k;n] of the left- and right-channel audio signals $S_L[m]$ and $S_R[m]$ contained in the nth frame. The letter "k" in F[k;n] is the time by which the sample is separated from the first sample. The value of "k" ranges from 0 to K−1 (k=0, ..., K−1). The discrete spectrum F[k;n] is given as follows equation (8):

$$F[k;n] = \left| \sum_{m=0}^{M-1} (S_L[m] + S_R[m])e^{-2\pi jmk/M} \right|^2 \quad (8)$$

The discrete spectrum F[k;n] is calculated by means of, for example, fast Fourier transform (FFT) or linear prediction analysis (LPC).

The discrete spectrum F[k;n], i.e., the output of the spectrum detector 17, is supplied to the characteristic buffer 18, as data that represents another characteristic of the audio signal.

Next, the broadcast-mode signal 2c supplied from the demodulator 2 (FIG. 1) is converted to a discrete value that corresponds to the frame constituting the audio signal.

More specifically, the broadcast-mode signal 2c in the nth frame is converted to a value B[n] which designate one of three broadcast modes, as is illustrated below:

$$B[n] = \begin{cases} 0 \text{(monaural } mod \text{ } e) \\ 1 \text{(stererophonic } mod \text{ } e) \\ 2 \text{(sound − multiplex } mod \text{ } e) \end{cases} \quad (9)$$

The discrete value B[n] obtained from-the broadcast-mode signal 2c is supplied to the characteristic buffer 18, as data that represents one of the characteristic of a TV broadcast signal.

Similarly, the time signal 3a supplied from the timer section 3 is converted to a discrete value T[n] that corresponds to the frames constituting the audio signal. The discrete value T[n] is supplied to the characteristic buffer 18, as data that represents a characteristic of the audio signal, The characteristic buffer 18 receives the output C[n] of the cut-change detector 12, the mean square A[n] of amplitude supplied from the amplitude detector 15, the correlation coefficient $A_{LR}[n]$, and the audio-signal energies $A_{LL}[N]$ and $A_{RR}[n]$ supplied from the correlation detector 16. The buffer 18 also receives the short-period discrete spectrum F[k;n] supplied from the spectrum detector 17, the discrete value B[n] of the broadcast-mode signal 2c, and the discrete value T[n] of the time signal 3a. The buffer 18 keeps storing the output C[n], mean square A[n], correlation coefficient $A_{LR}[n]$, audio-signal energies $A_{LL}[n]$ and $A_{RR}[n]$, short-period discrete spectrum F[k;n], and discrete values B[n] and T[n] for a predetermined time $T_3$. The time $T_3$ is, for example, 80 seconds, which is long enough for the buffer 18 to store at least one CM. Thus, the buffer 18 stores characteristic data G[n] that is composed C[n], A[n], $A_{LR}[n]$, $A_{LL}[n]$, $A_{RR}[n]$, F[k;n], B[n] and T[n], as is expressed in the following equation (10):

$$G[n]=\{C[n], A[n], A_{LR}[n], A_{LL}[n], A_{RR}[n], F[k;n], B[n],T[n]\} \quad (10)$$

The components 10 (the A/D converter) to 18 (the characteristic buffer) constitute the front-end section of the CM-detecting section 4 shown in FIG. 2. How the front-end section operates will be described with reference to the flowchart of FIGS. 3 and 4. In Steps S30 to 32 shown in FIG. 3, the video signal 2a is processed. In Steps S33 to S40 shown in FIG. 4, the audio signal 2b, broadcast-mode signal 2c and time signal 3a are processed.

Figure 3:
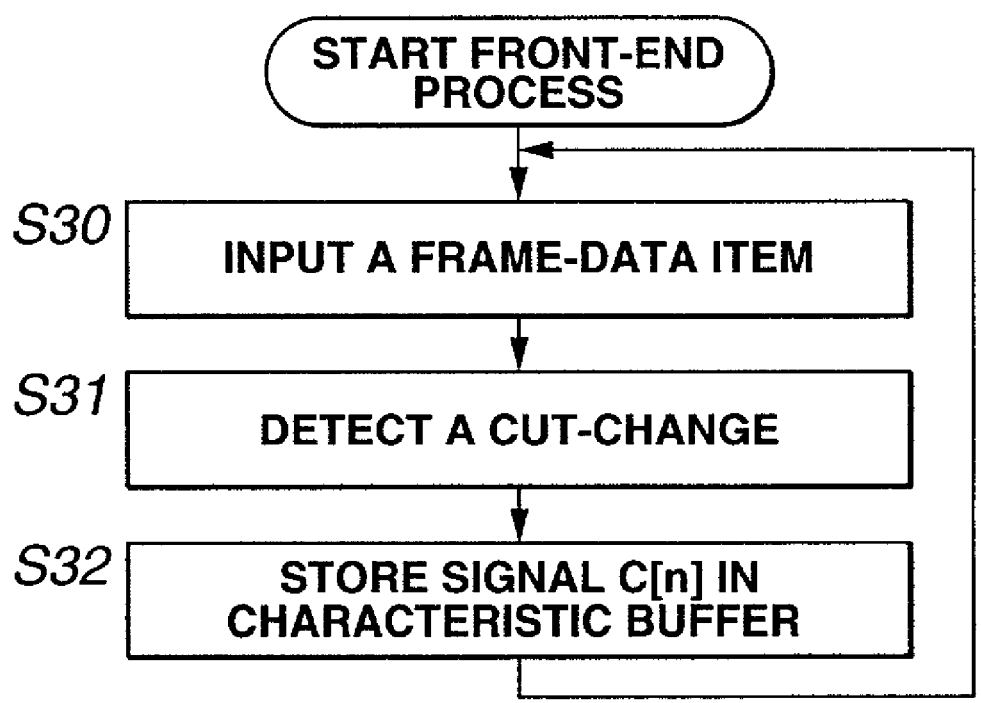
FIG. 3 is a flowchart illustrating how an audio signal is processed in the front-end section of the CM-detecting section.

As illustrated in FIG. 3, the A/D converter 10 converts the video signal 2a to a digital video signal. The digital video signal 2a, or at least one frame-data item, is stored into the frame memory 11 in Step S30. The frame memory 11 treats the one-frame video signal 2a as one sample. When the video signal 2a for one frame is input to the frame memory 11, the video signal 2a already stored in the memory 11 is shifted by a one-frame distance. As a result, the earliest video signal 2a stored is expelled or output from the frame memory 11.

Next, in Step S31, the video signal 2a is read from the frame memory 11 and supplied to the cut-change detector 12. The detector 12 generates a detection output C[n].

Thereafter, the characteristic buffer 18 stores the detection output C[n] in Step 32.

Then, the audio signal 2b is processed in the front-end section, as will be explained with reference to FIG. 4. A digital audio signal 2b generated by the A/D converter 13 is input to the audio signal buffer 14 in Step S33. The buffer 14 stores the signal 2b for at least one-frame cycle $T_2$ in Step S34. The audio signal buffer 14 treats the one-frame audio signal 2b as one sample. When the audio signal 2b for one frame-cycle $T_2$ is input to the audio signal buffer 14, the audio signal already stored in the buffer 14 is shifted by one frame-cycle $T_2$. As a result, the earliest audio signal 2b stored is expelled or output from the audio signal buffer 14.

After the audio signal 2b for at least one-frame cycle $T_2$ has been stored into the audio signal buffer 14, it is read in Step S35. The audio signal 2b thus read is supplied to the amplitude detector 15. The amplitude detector 15 finds the mean square A[n] of amplitude of the left- and right-channel audio signals.

In Step S36, the audio signal 2b stored in the audio signal buffer 14 is supplied to the correlation detector 16. As described above, the detector 16 calculates the correlation coefficient $A_{LR}[n]$, energy $A_{LL}[n]$ and energy $A_{RR}[n]$.

In Step S37, the audio signal 2b stored in the audio signal buffer 14 is supplied to the spectrum detector 17, too. As indicated above, the spectrum detector 17 obtains the short-period discrete spectrum F[k;n].

In Step S38, broadcast-mode signal 2c and timer signal 3a, which have been supplied from the demodulator 2 and timer section 3 (both shown in FIG. 1), respectively, are converted to a discrete value B[n] and a discrete value T[n].

In the front-end section, the characteristic data G[n] is stored into the characteristic buffer 18. As described above, the data G[n] is composed of the output C[n] of the cut-change detector 12, the mean square A[n] of amplitude supplied from the amplitude detector 15, the correlation coefficient $A_{LR}[n]$, audio-signal energies $A_{LL}[n]$ and $A_{RR}[n]$ supplied from the correlation detector 16, the short-period discrete spectrum F[k;n] supplied from the spectrum detector 17, the discrete value B[n] of the broadcast-mode signal 2c, and the discrete value T[n] of the time signal 3a.

Referring back to FIG. 2, it will be described how the back-end section operates. In the following description, the letter "n" indicates the number of any frame the characteristics of which are stored in the characteristic buffer 18. G[0] represents the characteristic data about the latest input frame. The longer the characteristic data has been stored in the buffer 18, the greater the frame number n. Whenever, a characteristic-data item is input to the buffer 18, all characteristic-data items are shifted for a one-frame distance in the characteristic buffer 18.

As shown in FIG. 2, the back-end section comprises a CM-candidate detector 19, an additional condition calculator 20, an additional condition analyzer 21, and a rule analyzer 22. The characteristic data stored in the characteristic buffer 18 is supplied, frame by frame, to the CM-candidate detector 19.

The CM-candidate detector 19 detects a CM candidate for each frame, based on the necessary conditions that almost all CMs satisfy. The first necessary condition is that the audio signal of a CM represents a small sound volume. Thus, a frame the sound volume of which is less than a prescribed threshold value satisfies the first necessary condition (hereinafter referred to as "sound-volume condition"). The second necessary condition is that an image changes to another abruptly. A frame the video a signal of which sharply changes or the luminance of which becomes uniform satisfies the second necessary condition (hereinafter referred to as "image condition"). The third necessary condition is that the interval between two frames satisfying the sound-volume: condition and the image condition is one of a few prescribed CM periods. The third necessary condition will be referred to as "time condition." The first to third necessary conditions can be given by the following equations (11), (12) and (13):

$$A[0] < A_{thsd} \quad (11)$$

$$C[0] = 1 \quad (12)$$

$$A[n_1] < A_{thsd}, C[n_1] = 1 \text{ or } A[n_2] < A_{thds}, C[n_2] = 1 \text{ or } \quad (13)$$
$$A[n_3] < A_{thsd}, C[n_3] = 1$$

where $A_{thsd}$ is the threshold value of a square of amplitude, and $n_1$, $n_2$, and $n_3$ are the prescribed CM periods (e.g., 15 seconds, 30 seconds, and 60 seconds). The CM periods are defined in units of frame cycles. In practice, CMs are broadcast for various periods of time, each of which is slightly different from 15 seconds, 30 seconds or 60 seconds. The CM periods $n_1$, $n_2$, and $n_3$ therefore have some tolerance each.

How the CM-candidate detector 19 performs its fiction will be explained, with reference to the flowchart of FIG. 5.

Figure 4:
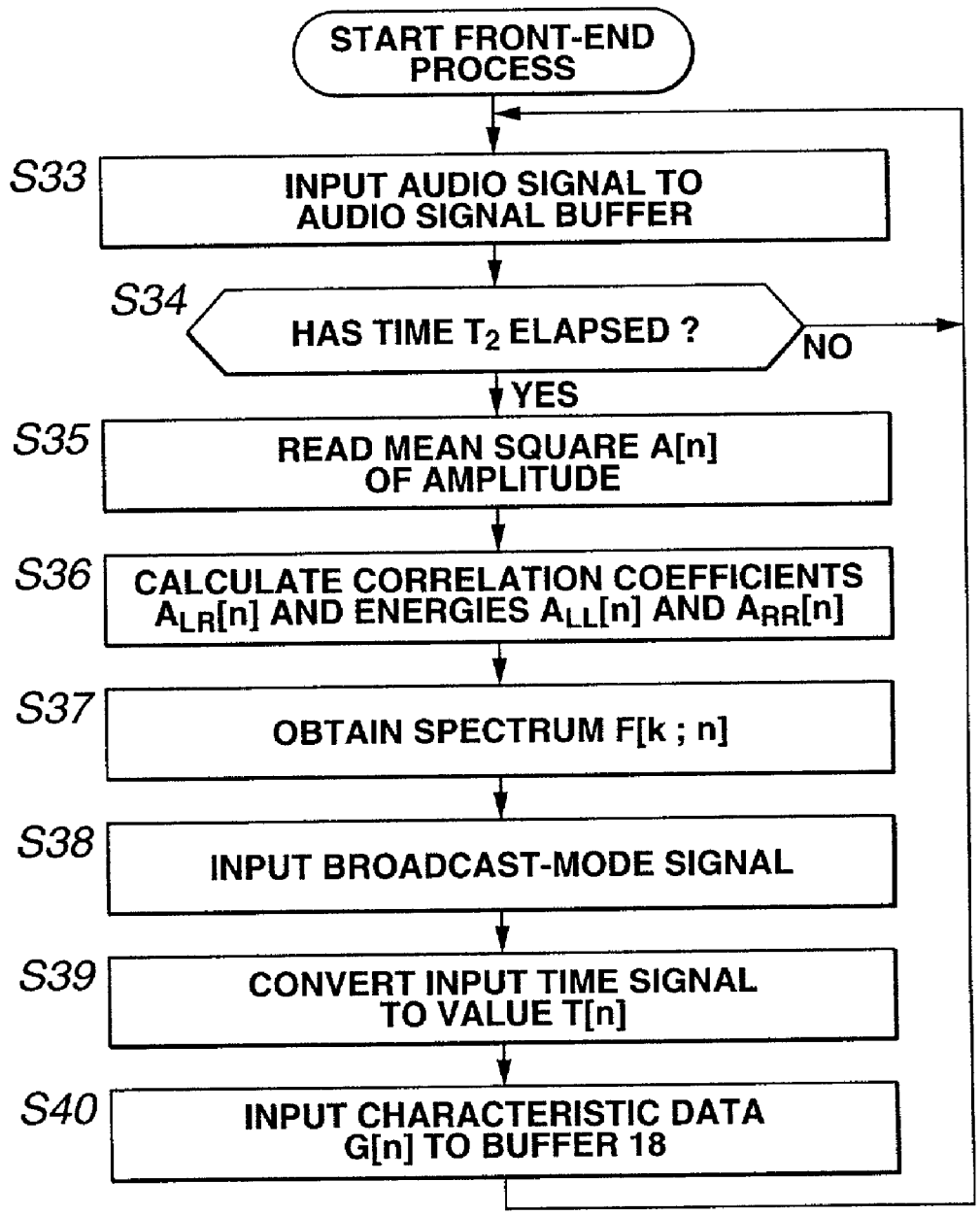
FIG. 4 is another flowchart explaining how an audio signal is processed in the front-end section of the CM-detecting section.
Figure 5:
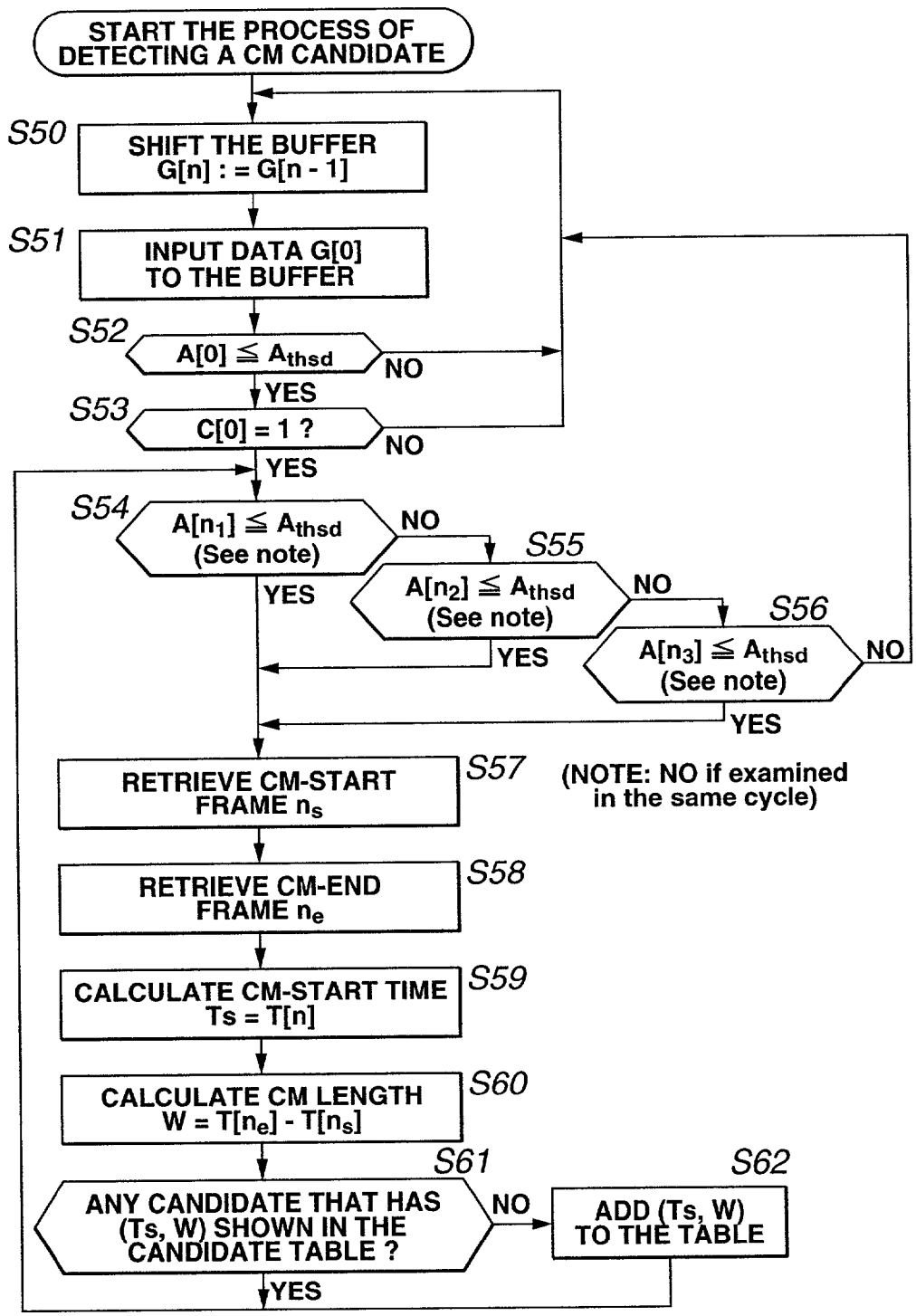
FIG. 5 is a flowchart illustrating how the CM-candidate detector of the CM-detecting section operates.

As shown in FIG. 5, the characteristic data is input to the characteristic buffer 18 in Step S50, shifted in the buffer 18 in Step S51 and output from the buffer 18, in units of frames as in the frame memory in Step S32 (FIG. 3) and as in the audio signal buffer in Step S40 (FIG. 4). In other words, the characteristic buffer 18 treats the characteristic data about one frame as one sample. When the characteristic data for one frame is input to the buffer 18, the audio characteristic data already stored in the buffer 18 is shifted by one frame-cycle. Thus, the earliest characteristic data stored is expelled or output from the characteristic buffer 18.

When the characteristic data for one frame (one sample) is input to the CM-candidate detector 19 after Steps S50 and S51 have been performed, the CM-candidate detector 19 carries out Step S52 and Step S53, determining whether the characteristic data for the frame (sample) satisfies the sound-volume condition, image condition and time condition. To be more specific, the detector 19 compares the first average square A[0] of amplitude with the prescribed threshold value $A_{thsd}$ in Step S52. Then, in Step S53, the detector 19 determines whether the detection output C[0] is 1 or not, or whether or not the frame satisfies the sound-volume condition, image condition and time condition. It may be determined in Step S52 that the average square A[0] of amplitude does not exceed the threshold value $A_{thsd}$, and it may be determined in Step S53 that the frame satisfies the sound-volume condition, image condition and time condition. In this case, the CM-candidate detector 19 determines that the frame is a CM candidate. Then, the operation proceeds to Step S57 et seq. (Step S54 through Step S56 will be described later.)

Conversely; it may be determined in Step S52 that the average square A[0] of amplitude exceeds the threshold value $A_{thsd}$, or and it may be determined in Step S53 that the frame does not satisfy the sound-volume condition, the image condition or the time, condition:. If so, the CM-candidate detector 19 determines that the frame cannot be a CM candidate, and the operation returns to Step 50.

If it is determined in Step S52 that the average square A[0] of amplitude does not exceed the threshold value $A_{thsd}$, and if it is determined in Step S53 that the frame satisfies the sound-volume condition, image condition and time condition, the CM-candidate detector 19 retrieves a CM-start frame $n_s$ in Step S57. Then, in Step S58, the detector 19 retrieves a CM-end frame $n_e$. In Step S59, the detector 19 calculates a CM-start time $T_s$. In Step S60, the detector 19 calculates a CM length W.

After performing Steps S57 to S60, the CM-candidate detector 19 refers to the CM-candidate table (described later) in Step S61, determines whether the CM-candidate table has a CM candidate that has the same CM-start time $T_s$ and the same CM length $T_w$ as the frame. If the CM-candidate table has such a CM candidate, the operation returns to Step S54, whereby Steps S54 to S56 will be repeated. If such a CM-candidate does not exists in the CM-candidate table, the operation advances to Step S62. In Step S62, the CM-start time $T_s$ and CM length $T_w$ are added to the CM-candidate table, defining a new CM candidate. Thereafter, the operation returns to Step 54; whereby Steps S54 to S56 will be repeated.

Steps S54 to S56 constitute a routine that is repeated on every time length. After this routine is repeated on all time lengths, the operation returns to Step S50. Then, the CM-candidate detector 19 performs Steps, S50 to S62 on the next input to the next frame input to it.

The CM-start frame $n_s$ is the first of the frames $n_1$, $n_2$ and $n_3$ (the frame $n_1$ is the earliest, and the frame $n_3$ is the latest) that has a mean square A[n] of amplitude exceeding the threshold value $A_{thsd}$. The CM-end frame $n_e$ is the last of the 0th frame and the frames preceding the 0th frame, which has a mean square A[n] of amplitude not exceeding the threshold value $A_{thsd}$. The CM-start time $T_s$ is the timing of the SM-start frame $n_s$, that is $T_s = T[ns]$. The CM length $T_w$ is obtained by the equation of: $T_w = T[n_e] - T[n_s]$.

Figure 6:
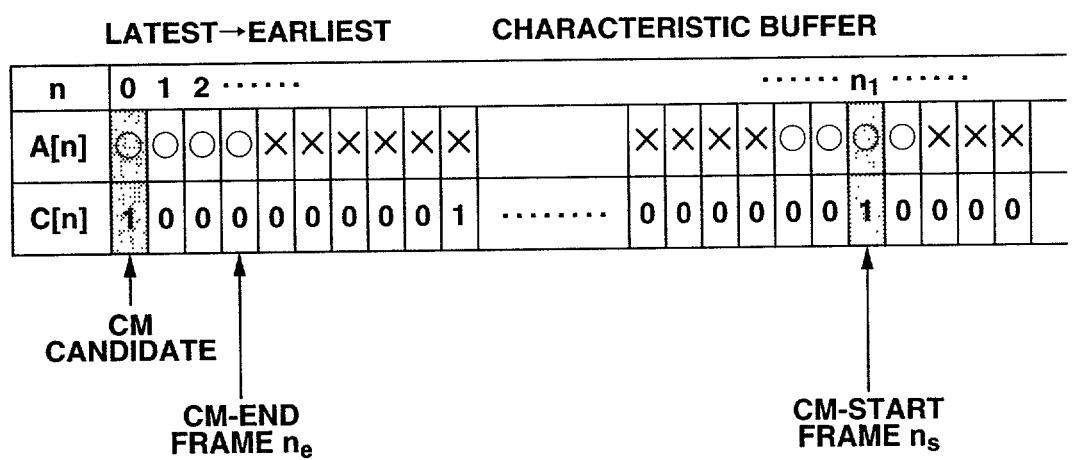
FIG. 6 is a diagram for explaining how to find necessary conditions.

How necessary conditions are calculated will be explained, with reference to the table of FIG. 6. In the A[n] column of this table, the symbol "○" indicates any frame that has a mean square of amplitude, which is less than the threshold value $A_{thsd}$, while the symbol "×" indicates any frame that has a mean square of amplitude, which is greater than or equal to the threshold value $A_{thsd}$. In this instance, the CM-start frame $n_s$ is the frame which have A[0], C[0], A[$n_1$] and C[$n_1$], all satisfying the conditions, which is the first of the frames on the left of $n_1$, and which has A[n]=×, and the CM-end frame $n_e$ is the last of the frames on the right of $n_1$, which has A[n]=○.

Performing the process described above, the CM-candidate detector 19 detects a CM candidate every time the characteristic data of one, frame (ie., one sample) is input to it. Any CM candidate the detector 19 has detected is added to the CM-candidate table.

FIG. 7 shows the CM-candidate table. As FIG. 7 shows,. the CM-candidate table shows various items, which are start time $T_s$, length $T_w$, characteristic data items $Q_1$ to $Q_{11}$, score R. and score Z. The data items $Q_1$ to $Q_{11}$ are calculated by the additional, condition calculator 20 as will be described later. The scores R and Z are calculated and determined by the additional condition analyzer 21 as will be explained later. The CM-candidate table 19a of the candidates detected by the CM-candidate detector 19 describes the CM-start time $T_s$ and CM length $T_w$ only. Thus, the CM-candidate table, describes the CM-start time $T_s$ and CM length $T_w$ detected by the CM-candidate detector 19, the characteristic data items $Q_1$ to $Q_{11}$ calculated by the additional condition calculator 20, and the scores R and Z obtained by the additional condition analyzer 21. The CM-candidate table is used for management of these characteristic data items. Any CM candidate is held in the CM-candidate table until it is determined to be either a CM or not. If determined to be a CM, the CM candidate will be output from the rule analyzer 22 as a CM signal 4a. If not determined to be a CM, the CM candidate will be discarded.

The CM-candidate table 19a formulated by the CM-candidate detector 19 and A describing the CM-start time $T_s$ and CM length $T_w$ only is supplied to the additional condition calculator 20.

The additional, condition calculator 20 refers to the data held in the characteristic buffer 18, extracting the characteristic data items $Q_1$ to $Q_{11}$ from the buffer 18. The are added the characteristic data items $Q_1$ to $Q_{11}$ to the CM-candidate table 19a, preparing a CM-candidate table 20a. The CM-candidate table 20a, thus prepared, is supplied to the additional condition analyzer 21.

FIGS. 8A to 8D illustrates how the condition calculator 20 calculates the characteristic data items $Q_1$ to $Q_{11}$.

In FIGS. 8A to 8D, the frame numbers (equivalent to discrete periods) are plotted on the ordinate. FIG. 8A shows a cut-change C[n], i.e., the output of the cut-change detector 12. FIG. 8B depicts the discrete value B[n] of the broadcast-mode signal 2c. FIG. 8C shows the short-period discrete spectrum S[k;n] of the audio signal. FIG. 8D illustrates the mean square A[n] of amplitude of the audio signal. The interval $n_1$ (depicted as period defined by two dotted lines) represents a CM candidate. In FIG. 8A, CT indicates the position where the cut-change C[n] has the value of 1 (or where a cut-change C[n] is detected). In FIG. 8B, M designates the period in which the video signal and audio signals are transmitted in any broadcast mode. In FIG. 8C, S1, S2, S3 and S4 denote the spectrum components of the audio signal. In FIG. 8D, AM indicates a change in the mean square A[n] of amplitude. In FIGS. 8A to 8D, $Q_1$ to $Q_{11}$ indicate the positions where the characteristic data items $Q_1$ to $Q_{11}$ are calculated.

The characteristic data items $Q_1$ to $Q_{11}$, which the additional condition calculator 20 calculates, will be explained one by one.

The characteristic data item $Q_1$ is a pre-break length. The pre-break length $Q_1$ is a low-volume period that immediately precedes a CM-candidate period. It is a period of time in which the mean square A[n] of amplitude remains below the threshold value $A_{thsd}$. In FIG. 8C, the pre-break length $Q_1$ is depicted as period BB defined by two one-dot, dashed lines.

The characteristic data item $Q_2$ is a post-break length. The post-break length $Q_2$ is a low-volume period that immediately follows a CM-candidate period. It is a period of time in which the mean square A[n] of amplitude remains below the threshold value $A_{thsd}$. In FIG. 8C, the pre-break length $Q_2$ is depicted as period AB defined by two one-dot, dashed lines.

The characteristic data item $Q_3$ is the minimum width of the pre-break length. The pre-break minimum width $Q_3$ is the minimum value the mean square A[n] of amplitude may have in the pre-break period $Q_1$.

The characteristic data item $Q_4$ is the minimum width of the post-break length. The post-break minimum width $Q_4$ is the minimum value the mean square A[n] of amplitude may have in the post-break period $Q_2$.

The characteristic data item $Q_5$ is a left-right correlation value. The left-right correlation value $Q_5$ represents the correlation between the left-channel audio signal $S_L[m]$ and right-channel audio signal $S_R[m]$ contained in the audio signal broadcast during any CM-candidate period. The correlation value $Q_5$ can be calculated from the values $A_{LR}[n]$, $A_{LL}[n]$ and $A_{RR}[n]$, which are expressed by the equations (5), (6) and (7), respectively, by using the following equation (14):

$$Q_5 = \frac{\sum_{n=n_s}^{n_e-1} A_{LR}[n]}{\sum_{n=n_x}^{n_e-1} A_{LL}[n] \sum_{n=n_s}^{n_e-1} A_{RR}[n]} \tag{14}$$

In the calculation of the equation (14), a part of the original waveform is added several times, due to the overlapping of the frame. This does not influence the operation of the CM-detecting section 4, nonetheless. If the section 4 has a memory that can store the data representing the original waveform and can process the data at high speeds, the correlation value $Q_5$ may be replaced by the correlation value of the original waveform.

The characteristic data item $Q_6$ is a mean amplitude. The mean amplitude $Q_6$ is the RMS value (mean square of amplitude) for the amplitude of an audio signal broadcast during any CM-candidate period. The mean amplitude $Q_6$ can be calculated in accordance with the following equation (15):

$$Q_6 = \sqrt{\frac{1}{n_e - n_s} \sum_{n=n_s}^{n_e-1} A[n]} \tag{15}$$

In the calculation of the equation (15), a part of the original waveform may be added several times due to the overlapping of the frame, as in the calculation of the left-right correlation value. However, this does not influence the operation of the CM-detecting section 4. If the section 4 has a memory that can store the data representing the original waveform and can process the data at high speeds, the mean amplitude $Q_6$ may be replaced by the RMS value of the original waveform.

The characteristic data item $Q_7$ is the number of cut-changes, or the number of times the image changes during a CM-candidate period. That is, the number of positions CT where the cut-change C[n] has the value of 1;

The characteristic data item $Q_8$ is the broadcast mode, which is predominant during a CM-candidate period. In the period between the CM-start frame $n_s$ and the CM-end frame $n_e$, this broadcast mode $Q_8$ is used more frequently than any other broadcast mode to obtain the discrete value B[n] of the broadcast-mode signal 2c.

The characteristic data item $Q_9$ is the number of candidates that are adjacent to the CM candidate of interest. The data item $Q_9$ indicates whether any sound-part preceding or following the CM candidate of interest is also a CM candidate or not. If both sound-parts preceding and following the CM candidate are CM candidates, respectively, the characteristic data item $Q_9$ has the value of 2. If only one of the sound-parts is a CM candidate, the characteristic data item $Q_9$ has the value of 1. If neither sound-parts is a CM candidate, the characteristic data item $Q_9$ has the value of 0. This operation is accomplished by referring to the MC-candidate table. The sound-part following the CM candidate of interest is determined to be a CM candidate in accordance with whether the sum of the CM-start time $T_s$, CM length $T_w$ and post-break period $Q_2$, $(T_s+T_w+Q_2)$, coincides with the start time $(T'_s)$ of the other CM candidate. Similarly, the sound-part preceding the CM candidate of interest is determined to be a CM candidate in accordance with whether the difference between the CM-start time $T_s$ and the pre-break period $Q_1$, $(T_s-Q_1)$, coincides with the sum of the start time $(T'_s)$ and CM length $T'_w$, $T'_s+T'_w$, of the other CM candidate.

The characteristic data items $Q_{10}$ and $Q_{11}$ are the energy of a pre-spectral difference and the energy of a post-spectral difference, respectively. The spectral difference energies are applied to measure the sound-quality change occurring at a boundary between the CM candidate and the program proper or another CM candidate. The characteristic data items $Q_{10}$ and $Q_{11}$ are defined as the square sum of two mean spectra existing on the sides of the boundary, respectively. The data items are generated by the following equations (16) to (21):

$$S_1[k] = \frac{1}{N} \sum_{n=0}^{N-1} F[k; n_e - n] \tag{16}$$

$$S_2[k] = \frac{1}{N} \sum_{n=0}^{N-1} F[k; n_s + n] \tag{17}$$

$$S_3[k] = \frac{1}{N} \sum_{n=0}^{N-1} F[k; n_e - n] \tag{18}$$

$$Q_{10} = \frac{1}{S_{norm}^2} \sum_k (S_2[k] - S_1[k])^2 \tag{19}$$

$$Q_{11} = \frac{1}{S_{norm}^2} \sum_k (S_4[k] - S_3[k])^2 \tag{21}$$

In the equations (16) to (21), N is the number of frames for which a mean spectrum is obtained, $n'_e$ is the number of the end frame of a sound-part that immediately precedes a CM candidate (See FIG. 8), $n'_s$ is the number of the start frame of a sound-part that immediately follows a CM candidate, $S_1[k]$ is the mean spectrum immediately preceding the end of a sound-part that immediately precedes the CM candidate, $S_2[k]$ is the mean spectrum immediately following the start of the CM candidate, $S_3[k]$ is the mean spectrum that immediately precedes the end of the CM candidate, $S_4[k]$ is the mean spectrum that immediately follows the end of the CM candidate, and $S_{norm}$ is an appropriate normalization coefficient.

The additional condition calculator 20 adds the characteristic data items $Q_1$ through $Q_{11}$, thus calculated, to the CM-candidate table 19a. The CM-candidate table 19a is thereby rewritten into a new CM-candidate table 20a. The CM-candidate table 20a is supplied to the additional condition analyzer 21.

The additional condition analyzer 21 first converts the characteristic data items described in the CM-candidate table 20a, into nonlinear parameters. The analyzer 21 then performs weighting addition on the nonlinear parameters, thereby calculating a score R for the CM candidate. If the score R exceeds a prescribed value, the analyzer 21 determines that the CM candidate is a prominent one and generates a score Z. The additional condition analyzer 21 describes the score R and the score Z. in the CM-candidate table 20a, rewriting the table 20a to a new CM-candidate table 21a.

Figure 9:
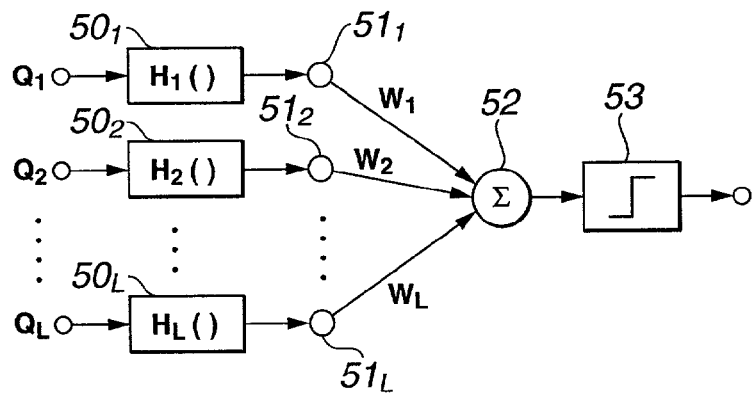
FIG. 9 is a diagram depicting the additional condition analyzer.

FIG. 9 schematically illustrates the additional condition analyzer 21. One skilled in the art will recognize that the additional condition analyzer also may be a multi-layer perceptron.

As shown in FIG. 9, the characteristic data items $Q_1$ to $Q_L$ shown in the CM-candidate table 21a are input to function operators $50_1$ to $50_L$, respectively. The unction operators $50_1$ to $50_L$ apply parameter-transform functions $H_1(\ )$ to $H_L(\ )$ to the characteristic data items $Q_1$ to $Q_L$, respectively. The characteristic data items $Q_1$ to $Q_L$, thus processed, are supplied to weighting devices $51_1$ to $51_L$ The weighing devices $51_1$ to $51_L$ multiply the data items $Q_1$ to $Q_L$ by weights $W_1$ to $W_L$, respectively. The data items $Q_1$ to $Q_L$, thus weighted, are supplied to an adder 52. The adder 52 adds the data items $Q_1$ to $Q_L$, generating a score R. The score R is supplied to a score analyzer 53. The score analyzer 53 compares the score R with a predetermined threshold value. If the score R is equal to or greater than the threshold value, the score analyzer 53 generates data showing that the CM candidate is a prominent one. If the score R is less than the threshold value, the CM candidate is erased from the CM-candidate table.

More specifically, the additional condition analyzer 21 generates the score R by using the equation (22) described below:

$$R = \sum_{l=1}^{L} W_l H_l(Q_l) \tag{22}$$

where $H_1(\ )$ is a parameter-transform function to be applied to a characteristic data item, $W_1$ is a weight to be applied to a characteristic data item, and L is the number (i.e., 11) of characteristic data items input to the analyzer 21. In the equation (22), 1 is any one of integers 1 to 11.

Figure 10A:
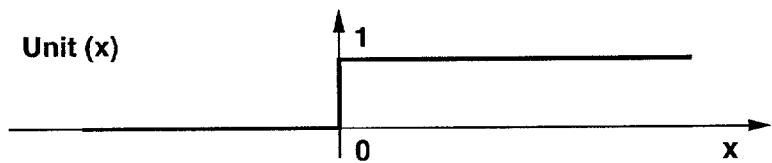
FIGS. 10A to 10C are a timing chart for explaining the step functions, rectangle function and sigmoid fiction that are applied to score calculation.
Figure 10B:
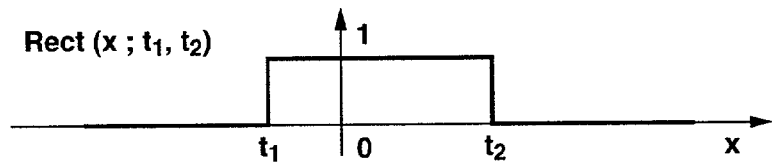

The parameter-transform functions $H_1(\ )$, which are used in the function operators $50_1$ to $50_L$, may be rectangle functions, which are simpler than any other kinds of functions. For example, the functions $H_1(\ )$ are the rectangle functions Rect $(x; t_1, t_2)$ shown in FIG. 10B. Assume that each characteristic data item has a normal value ranging from the lower limit $t_{11}$ and the upper limit $t_{21}$. Then, the characteristic data item $Q_1$, for example, has the value of 1 if it falls within the normal-value range, or the value of 0 if it falls outside the normal-value range, as can be understood from the following equation (23):

$$H_1(Q_1) = \text{Rect}(Q_1; t_1, t_2) \tag{23}$$

To change the value of any characteristic data item, gradually from 0 to 1 or from 1 to 0 at the above-mentioned boundary, the functions $H_1(\ )$ may be sigmoid functions Sigm $(x; t_1, t_2)$, as can be understood from the following equation (24);

$$H_1(Q_1) = Sigm(Q_1; t_{1l}, t_{2l}) \tag{24}$$

$$= \frac{1}{1 + \exp(-(x-t_{1l})/\sigma_{1l})} \cdot \frac{1}{1 + \exp((x-t_{2l})/\sigma_{2l})}$$

Figure 10C:
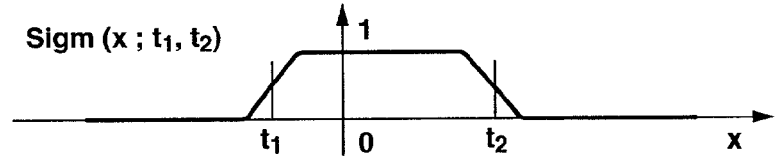

FIG. 10C shows a sigmoid function. Note that $s_{11}$ and $s_{21}$ are constants that represent the degree of changing characteristic data items. The constants $s_{11}$ and $s_{21}$ have been set in accordance with the distribution of the characteristic data items.

The weight W1 applied by the weighing devices $51_1$ to $51_L$ may be statistically predetermined based on the characteristic data. Alternatively, the weight $W_1$ may be automatically determined through learning that may be implemented by using a neural network (disclosed in, for example, Nakagawa, "Pattern-Information Processing," Marzen, 1999). In the equation (24), 1 is any one of integers 1 to 11.

The score analyzer 53 analyzes the score R in accordance with a threshold value, as is shown in the following equation (25):

$$Z = \text{Unit}(R - t_r) \quad (25)$$

where Unit (x) is a unit-step fiction that is 1 if x>0 and is 0 if x<0, and $t_r$ is the threshold value for the score R. The threshold value $t_r$ is either predetermined or automatically obtained by learning.

The rule analyzer 22 receives the CM-candidate table 21a generated by describing the scores R and Z in the table 20a by means of the additional condition analyzer 21. The rule analyzer 22 generates a CM-start time and a CM length as a crucial CM signal 4a in accordance with the prescribed rules that will be explained later. More precisely, the rule analyzer 22 effects rule processing, thus selecting the most prominent CM candidate if there are two or more CM candidates at the same time. (The event that two or more CM candidates exist at the same time shall be referred to as "conflict.")

How the rule analyzer 22 operates will be explained, with reference to the flowchart of FIG. 11.

In Step S70, the rule analyzer 22 selects one of the CM candidates shown in the CM-candidate table. More correctly, the rule analyzer 22 first selects the earliest CM candidate listed in the table, longer than a preset time $T_4$. Time $T_4$ is a period long enough to hold several CM candidates, for example 150 seconds.

In Step S71, the rule analyzer 22 determines whether any other CM candidate exists in the period of the CM candidate selected (i.e., the period from $T_s$ to $T_s+T_w$). If NO in Step S71, or if no other CM candidates exist in this period, the CM candidate selected is output as a CM signal and is erased from the CM-candidate table.

If YES in Step S71, or if any other CM candidate exists in that period, it is determined that the CM candidate selected conflicts with the other CM. In this case, the rule analyzer 22 applies a so-called "minimum-length priority rule" to give priority to the shortest of CM candidates that conflict with one another. Assume a 30-second period is available for CMs, in which one 30-second CM or two 15-second CMs may be broadcast. When the minimum-length priority rule is applied, the two 15-second CMs are selected, and the 30-second CM is discarded.

An example of the minimum-length priority rule will be described, with reference to FIG. 12.

As shown in FIG. 12(A), four CMs, CM1 to CM4, are continuously in one period. In this period, eight CM candidates A to H shown in in FIG. 12(B), which are contained in the CM-candidate table, may be broadcast.

Assume that the CM candidate A has been selected as shown in FIG. 12(C). The candidate A conflicts with the candidates E and H. The candidates A and B can be broadcast in the period provided in which the candidate E may be broadcast. The candidates A, B, C and D can be broadcast in the period in which the candidate H may be broadcast. Thus, the candidates B, C and D are discarded, and the candidate A is selected. When the candidate B is selected as shown at in FIG. 12, the candidate F conflicts with the candidate B. (At this time, the candidates E and H have been discarded.) That is, the candidate B is selected while the candidate C is discarded, because the candidates B and C can be broadcast in the period for the candidate F. Similarly, when the candidate C is selected as shown at E in FIG. 12, the candidate G conflicts with the candidate C. Namely, the candidate C is selected and the candidate D is discarded, because the candidates C and D can be broadcast in the period for the candidate G. Further, when the candidate D is selected as shown at F in FIG. 12, no other CM candidates conflicts with the candidate D. In this case, the minimum-length priority rule need not be applied at all, and the candidate D is selected.

Thus, the candidates A, B, C and D are selected. If any CM candidates conflict with one another and if the minimum-length priority rule cannot be applied to them, the process of selecting CM candidates will be terminated, while maintaining these CM candidates in the CM-candidate table.

Figure 11:
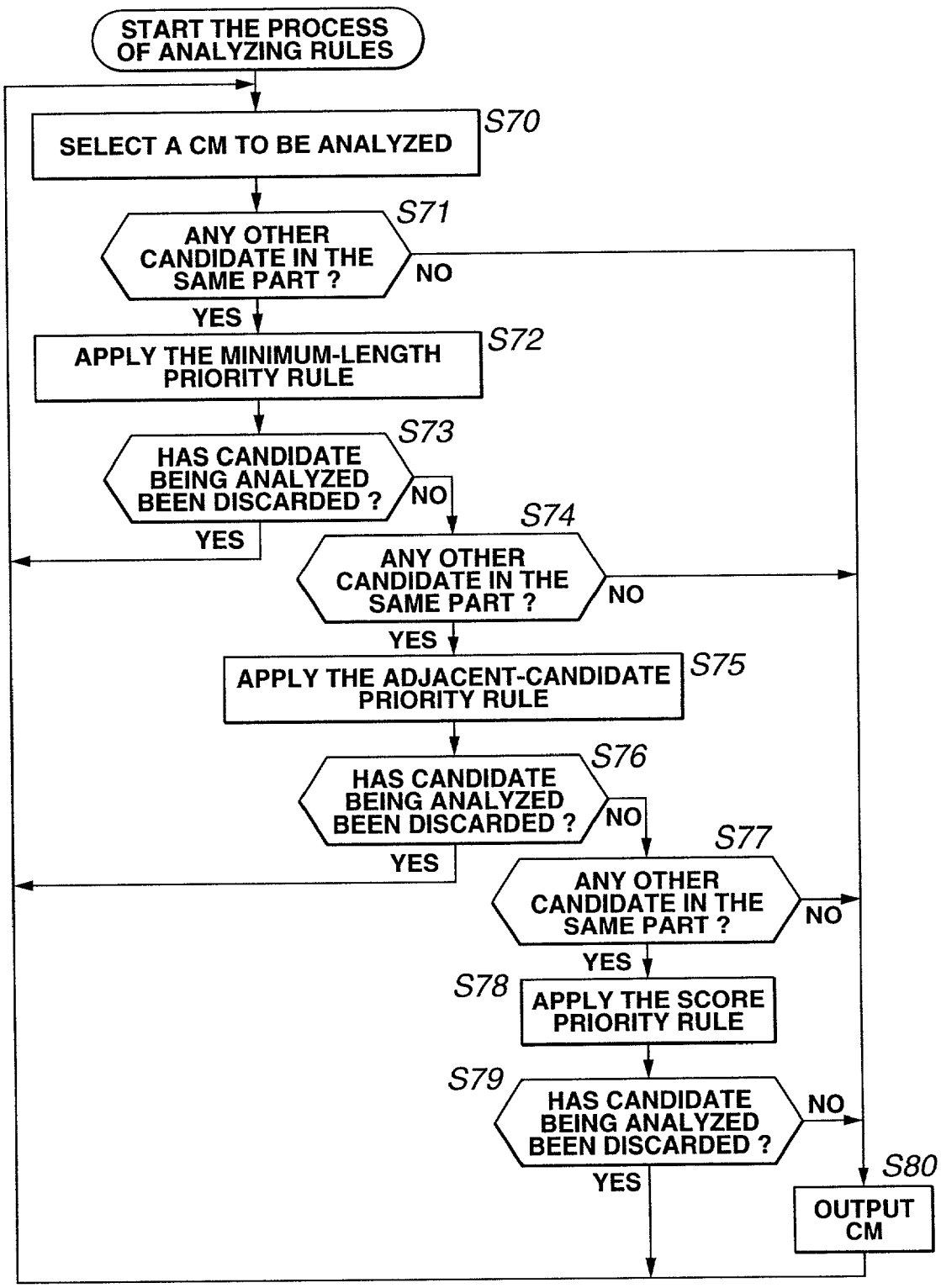
FIG. 11 is a flowchart explaining the operation of the rule analyzer that is provided in the CM-detecting section.

After selecting CM candidates by applying the minimum-length priority rule, the rule analyzer 22 performs Step S73 (FIG. 11). In Step S73, the rule analyzer 22 determines whether the CM candidate has been discarded or not. If YES, that is, if the CM candidate has been discarded, the analyzer 22 erases the CM candidate from the CM-candidate table. In this case, the operation returns to Step S70. If NO, that is, if the CM candidate has not been discarded, the operation goes to Step S74. In Step S74, the rule analyzer 22 searches the CM-candidate table, determining whether any other CM candidate exists in the same part as the CM candidate being analyzed.

If NO in Step S74, or if no other CM candidates exist in the same part, the rule analyzer 22 outputs the CM candidate analyzed, as a CM signal, and erases this CM candidate from the CM-candidate table. If YES in Step S74, or if any other CM candidate exists in the same part, the operation of the analyzer 22 advances to Step S75.

In Step S75, the rule analyzer 22 applies a so-called "adjacent-candidate priority rule." More precisely, the analyzer 22 searches for a CM candidate, if any, which immediately precedes or follows the CM candidate being analyzed and which conflicts therewith.

The adjacent-candidate priority rule will be described, with reference to FIG. 13

In this instance, six candidates I to N shown in FIG. 13(B) exists in a broadcast-signal part containing four CMs, CM11 to CM14 that are continuously broadcast, as is illustrated at A in FIG. 13. The candidates M and N are more prominent than the others, because they happen to have a cut-change and a small sound-part. In fact, they are not CMs. Nonetheless, they contain a CM each. Hence, they may not be discarded even if they have been found not to be CMs in the score test.

In this case, as shown in FIG. 13(C), the earliest candidate I is first determined to be a CM. The candidate I conflicts with candidate M. The candidate I has an adjacent candidate J, whereas the candidate M has no adjacent candidates. Therefore, the candidate I is therefore used, and the candidate M is discarded. The candidate J may be determined to be a prominent candidate as shown in FIG. 13(D). If so, the candidate J conflicts with the candidate N. The candidate J has adjacent candidates I and K, whereas the candidate N has no adjacent candidates. Thus, the candidate J is used, and the candidate N is discarded. As shown in FIGS. 13(E) and 13(F), no candidates conflict with the remaining candidates K and L. The adjacent-candidate priority rule is no longer applied. As a result, the candidates K and L are both used.

Thus, the candidates I, J, K and L are selected from the broadcast-signal part shown in FIG. 13, as prominent CM candidates.

Some candidate that conflicts with any other candidate may have no adjacent candidates at all. Alternatively, some candidates may have adjacent candidates each. In either case, such candidates are not discarded and remain in the CM-candidate table.

Referring back to FIG. 11, the operation of the rule analyzer 22 goes from Step S75 to Step S76. In Step S76, the analyzer 22 determines whether the candidate that is being analyzed has been discarded in accordance with the adjacent-candidate priority rule. If YES in Step S76, that is, if the candidate has been discarded, the analyzer 22 erases the candidate from the CM-candidate table and returns to Step S70. If NO in Step S76, that is if the candidate has not been discarded, the analyzer 22 goes to Step S77. In Step S77, the rule analyzer 22 searches the CM-candidate table to determine whether any other prominent CM candidate exists in the same part as the candidate being analyzed.

If NO in Step S77, or if the no other prominent CM candidates exist, the rule analyzer 22 proceeds to Step S80. In Step S80, the analyzer 22 discards the CM candidates being analyzed, from the CM-candidate table. If YES in Step S77, or if the any other prominent CM candidate exists, the analyzer 22 goes to Step S78. In Step S78, the analyzer 22 applies a so-called "score priority rule." The score priority rule is applied repeatedly until the candidate being analyzed no longer conflicts with any other CM candidates.

The score priority rule will be explained, with reference to FIG. 14.

Four CMs, CM21 to CM24, which are continuously broadcast in a part of the broadcast signal, are shown in FIG. 14(A). Seven CM candidates P to W exist in this part of the broadcast signal, as is illustrated in FIG. 14(B).

In this case, the earliest candidate P is first analyzed. The candidate P conflicts with candidate U. The conflict cannot be eliminated even if the minimum-length priority rule or the adjacent-candidate priority rule is applied.

Thus, the rule analyzer 22 searches the CM-candidate table for all possible conflicts that may occur among the seven candidates. Six conflicts are possible, which are (P-U), (U-Q), (Q-V), (V-R), (R-W) and (W-S). In the score priority rule, the candidate having the highest score is adopted. In this case, the candidate R has the score R(2.0). The candidate R is therefore selected as is illustrated in FIG. 14(D). As a result, the candidates V and W are discarded because they conflict with the candidate R.

As shown in FIG. 14(E), the conflict (P-U) has not been eliminated yet, however. Therefore, the rule analyzer 22 again searches the CM-candidate table for all possible conflicts concerning these candidates P and U. Now that the candidate V has been discarded, there are only two conflicts involving three candidates, i.e., (P-U) and (U-Q).

Of these three candidates, the candidate Q has the highest score (1.9). Thus, as shown in FIG. 14(F), the candidate U, which conflicts with the candidate Q, is discarded. Thus, the candidate P no longer conflicts with any other candidate and is adopted. The candidates U, V and W are discarded, whereas the candidates Q, R and S are used.

Assume that all related conflicts are not retrieved and the score priority rule is applied to only the conflict now concerned (i.e., the conflict between the candidates P and U, in this instance). The candidate U is then adopted first, while the candidate P is discarded. When the candidates U and Q conflict with each other later, the candidate U is discarded, too, though it has been adopted once. Thus, the rule analyzer 22 retrieves related conflicts to prevent the candidate P from being discarded when the operation is carried out in a spontaneous sequence.

As the score priority rule is thus applied, any candidate selected no longer conflicts with any other candidate.

Referring to FIG. 11 again, the rule analyzer 22 goes from Step S78 to Step S79. In Step S79, the analyzer 22 determines whether the CM candidate being analyzed has been discarded in accordance with the score priority rule. If YES in Step. S79, that is, if the CM candidate in question has been discarded, the analyzer 22 erases the candidate from the CM-candidate table and returns to Step S70. If NO in Step S79, that is, if the CM candidate has not been discarded, the analyzer 22 goes to Step S80. In Step S80, the analyzer 22 outputs the start time and length of the CM candidate, as a CM signal. Then, the rule analyzer 22 returns to Step S70.

In the CM-detecting section 4 that is the first embodiment of the present invention, the CM candidates are extracted from a program in accordance with whether or not they satisfy the necessary conditions. Of the CM candidates thus extracted, those, which satisfy the additional conditions are statistically regarded as prominent ones and selected. Thus, logical conditions are applied, thereby eliminating the overlapping of the CM candidates. This achieves high-accuracy CM detection. The first embodiment is a CM-detecting section for use in an analog TV video-audio recorder. Nonetheless, the CM-detecting section 4 can be applied to a digital TV video-audio recorder, too. Moreover, the CM-detecting section 4 can be used in recording radio-programs. In this case, the components which process the video signal may be removed.

A CM-detecting section 4, which is the second embodiment of the invention, will be described.

Figure 15:
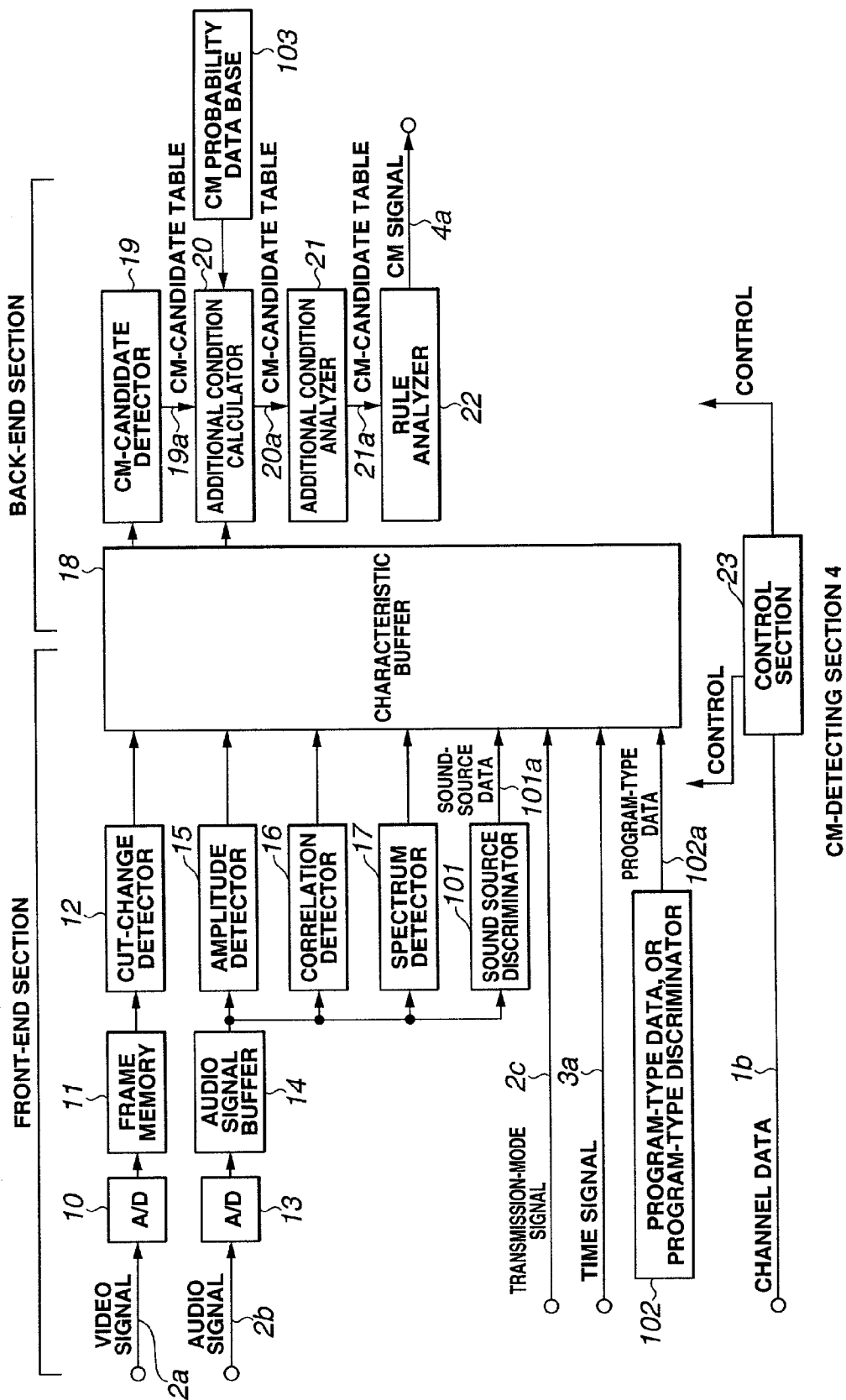
FIG. 15 is a block diagram illustrating a CM-detecting section that is the second embodiment of the present invention.

FIG. 15 illustrates the CM-detecting section 4, i.e., the second embodiment of the invention.

The CM-detecting section 4, i. e., the second embodiment, has only fundamental ones of the additional conditions described above. More precisely, the second embodiment has the additional conditions (1) to (14) only, not having the remaining additional conditions (11) to (14). Its structure is therefore simplified, not so complicated as that of the first embodiment.

Like the first embodiment shown in FIG. 2, the second embodiment comprises a front-end section and a back-end section. The components identical in function to those shown in FIG. 2 are designated at the same reference numerals in FIG. 15 and will not be described in detail. The CM-detecting section 4 shown in FIG. 15 has components 101, 102 and 103, which are not used in the first embodiment (FIG. 2). The additional condition calculator 20 performs more functions than its equivalent of the first embodiment. Only the additional functions of the calculator 20 will be explained.

A sound source discriminator 101 receives an audio signal $2b$ that is a digital frame signal and outputs the name of the sound source concerning the frame of the audio signal $2b$. The sound source may be voice, music, a voice-music combination or the like. The discriminator 101 may identify the sound. source by using one of various techniques available at present. An example of the technique is disclosed in Kawachi et al., "Automatic Classification of Broadcast Sounds on the Basis of VQ Distortion," Shingaku Giho, DSP97-95/SP97-50, 43/48 (1998). Another example is disclosed in Minami et al., "Image Indexing Using Audio Data and the Application Thereof," Shingaku Proceedings, Vol. J81-D-II, No. 3, 529/537 (1998). Still another. example is disclosed in the specification and drawings of Jpn. Pat. Appln. Laid-Open Publication 2001-024980, inventor: Abe.

The name of any sound source, identified by the sound source discriminator 101, is converted to a numerical value for each frame of the audio signal. For example, numerical value 1 represents voice, numerical value 2 indicates music. The numerical value is a characteristic data item U[n], which is input to the characteristic buffer 18.

The front-end section incorporates a program-genre data/program-genre discriminator 102. This discriminator 102 outputs the program-genre data showing the genre of the program that is being processed. The program genre may be news, dramas, baseball games, football games, or the like. The program-genre data may be input by the user who has read a TV program list. In recent years, the program-genre data can be automatically acquired through a network such as the Internet. The discriminator 102 may be a device that identifies the genre of a program, not from externally received data, but from the audio signal and video signal. The technique of identifying the genre of a program from the audio and video signals is disclosed in, for example, Jpn. Pat. Appln. Laid-Open Publication No. 11-190693, inventor: Abe.

The genre of the program, which the program-genre data/program-genre discriminator 102 has output, is converted to a numerical value for each frame of the audio signal. For example, numerical value 1 represents news, numerical value 2 dramas, and the like. The numerical value is another characteristic data item W[n], which is input to the characteristic buffer 18.

The front-end section is identical to the front-end section shown in FIG. 2, except that it has two more components, i.e., the sound source discriminator 101 and the program-genre data/program-genre discriminator 102.

The characteristic buffer 18 stores the characteristic data item U[n] generated by the sound source discriminator 101 and characteristic data item W[n] generated by the program-genre data/program-genre discriminator 102. As a result, the characteristic data G[n] expressed by the equation (10) extends to the following in the characteristic buffer 18:

$$G[n] = \{C[n], A[n], A_{LR}[n], A_{LL}[n], A_{RR}[n], F[k;n], B[n], T[n], U[n], W[n]\} \quad (26)$$

The CM-candidate detector 19 of the back-end section is of the same type as the one shown in FIG. 2. Nonetheless, the CM-candidate tables 19a to 2a extend in the second embodiment, as will be described below. That is, the CM-candidate table 19a to 21a show characteristic data items $Q_{12}$ to $Q_{15}$, in addition to data items $Q_1$ to $Q_{11}$, as is shown in FIG. 16. FIG. 16 shows the additional data items $Q_{12}$ to $Q_{15}$, not showing the data items $Q_1$ to $Q_{11}$.

The back-end section has a CM-probability database 103. The database 103 stores two types of probability data. The first type of probability data represents the probability of broadcasting CMs in specific hours. The second type of probability data indicates the probability of broadcasting specific genres of programs for specific periods. The CM-probability database 103 keeps outputting the probability data items of both types, which are supplied to the additional functions of the calculator 20. The probability data items may be prepared from statistical record of the CMs actually broadcast in the past.

The additional functions of the calculator 20 used in the second embodiment has its operating capacity expanded to perform operations on not only the characteristic data items $Q_1$ to $Q_{11}$, but also the characteristic data items $Q_{12}$ to $Q_{15}$.

The characteristic data item $Q_{12}$ has been acquired by determining whether a CM-candidate contains a sound part or not. The data item $Q_{12}$, which indicates the presence or absence of a sound part, is obtained by the following equation:

$$Q_{12} \begin{cases} 1 (\text{if}^3 U[n] = (\text{voice}) \text{or}^3 U[n] = (\text{voice} + \text{music}) \text{for } n_s \leq n < n_e) \\ 0 (\text{otherwise}) \end{cases} \quad (27)$$

The characteristic data $Q_{13}$ has been acquired by determining whether a CM-candidate contains a music part or not, in the same way the characteristic data item $Q_{12}$ has been generated in accordance with whether a CM-candidate contains a sound part. The data item $Q_{13}$, which indicates the presence or absence of a music part, is obtained by the following equation:

$$Q_{13} \begin{cases} 1 (\text{if}^3 U[n] = (\text{voice}) \text{or}^3 U[n] = (\text{voice} + \text{music}) \text{for } n_s \leq n < n_e) \\ 0 (\text{otherwise}) \end{cases} \quad (28)$$

The characteristic data $Q_{14}$ represents the probability of broadcasting CMs at present, or at this time of the day. The additional condition calculator 20 receives the CM-broadcasting probability from the CM-probability database 103 and substitute the same in the characteristic data $Q_{14}$.

The characteristic data $Q_{15}$ indicates the probability of broadcasting CMs, interrupting a program of a specific genre that is being broadcast for a specific period. The additional condition calculator 20 receives the CM-broadcasting probability from the CM-probability database 103 and substitute the same in the characteristic data $Q_{15}$.

In the additional condition analyzer 21 and rule analyzer 22, the characteristic data items $Q_{12}$ to $Q_{15}$ are extended in the same way as in the CM-detecting section 4 shown in FIG. 2. How the items $Q_{12}$ to $Q_{15}$ are extended is not explained here.

The CM-detecting section 4 of the second embodiment can thus detect CMs in accordance with the sound source of the signals broadcast. Since, it can detect CMs in accordance with the present time or the genre of the programs that is being broadcast.

A CM-detecting section 4 that is the third embodiment of the invention will be described, with reference to FIG. 17. In the third embodiment, the additional condition calculator 20 generates data items $Q_{16}$ to $Q_{18}$ representing the number of small amplitudes, the small-amplitude period and the signal dispersion, respectively.

Figure 18:
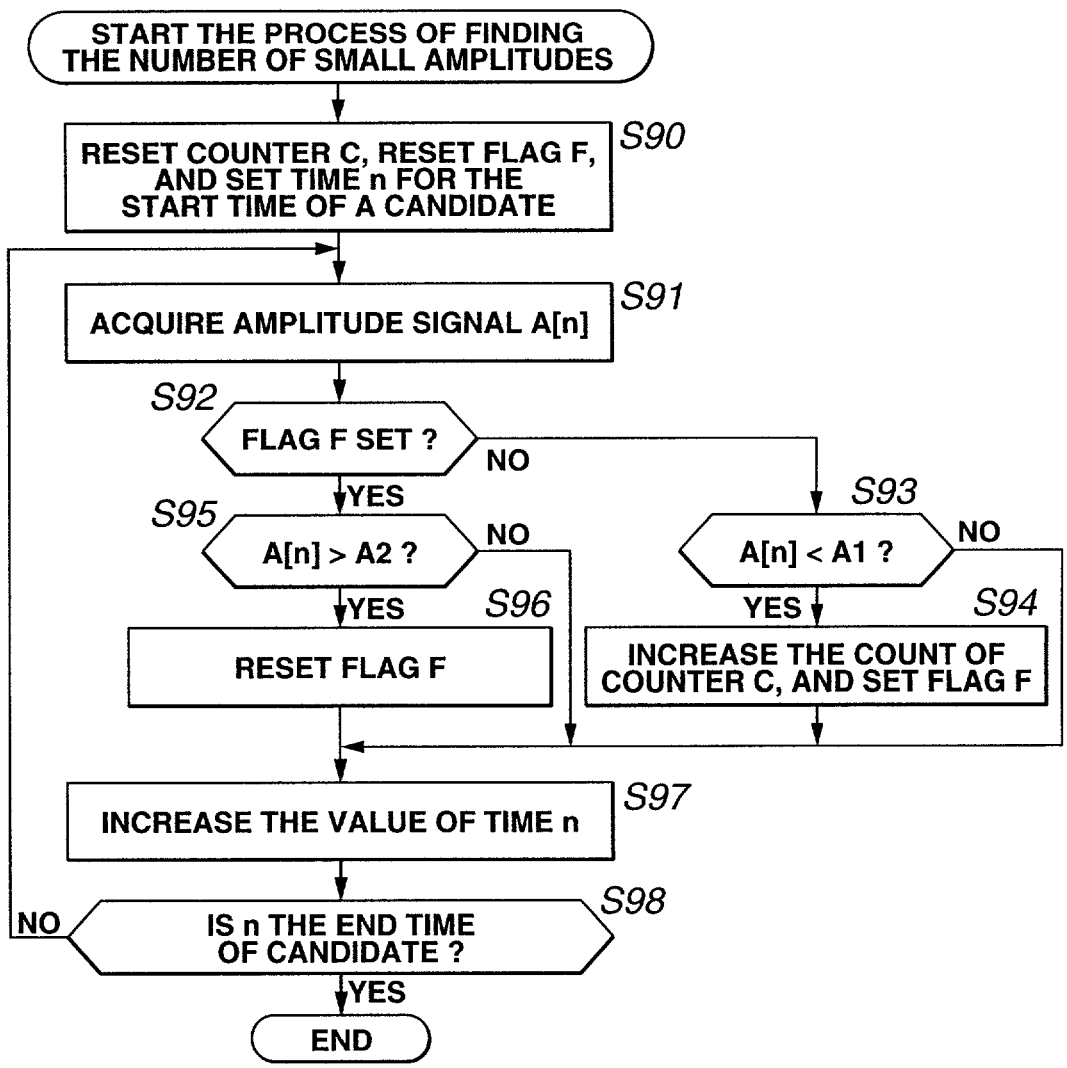
FIG. 18 is a flowchart explaining how the additional condition calculator provided in the CM-detecting section finds the number of times of a small-amplitude.

The number of small amplitudes is the number of times the amplitude of the audio signal falls below a prescribed threshold value. The additional condition calculator 20 performs, for example, the sequence of operations depicted by the flowchart of FIG. 18, thereby to calculate the number of small amplitudes.

First, the additional condition calculator 20 sets a counter C and a flag F in Step S90. The counter C holds the number of small amplitudes. The flag F indicates a small-amplitude period. In Step S90, time n is set at the start time of a CM candidate.

In Step S91, the amplitude A[n] of the audio signal is obtained, where n is the time the audio signal has been converted to discrete values.

In Step S92, the calculator 20 determines whether the flag F has been set or not. If the flag F has not been set, the operation proceeds to Step S93. In Step S93 the calculator 20 determines whether the amplitude A[n] of the audio signal is less than a prescribed threshold value A1. If the amplitude A[n] is found equal to or greater than A1, the operation advances to Step S97. In Step S97, the value of time n is increased. Then, in Step S98, the calculator 20 determines whether the end time of the CM candidate has been reached or not. If NO, the operation returns to Step S91, in which the amplitude A[n] the audio signal has at this time is obtained.

Steps S91 to S93 and Step S98 are repeated until the additional condition calculator 20 determines that the amplitude A[n] is less than the threshold value A1. If the amplitude A[n] is found less than the threshold value A1, the operation goes to Step S94. In Step S94, the count of the counter C is increased by one and the flag F is set.

Thereafter, the operation advances to Step S97, in which the value of time n is increased. In Step S98, the calculator 20 determines whether the value of time n, thus increased, is equal to the end time of the CM candidate. If NO, the operation returns to Step S91, in which the amplitude A[n] the audio signal has at this time is obtained.

In Step S92, it is determined whether the flag F has been set or not. Since the flag F is set, the operation proceeds to Step S95. In Step S95, the additional condition calculator 20 determines whether the amplitude A[n] obtained in Step S91 is greater than a preset threshold value 2. Note that this threshold value 2 is greater than the threshold value A1 that is compared with the amplitude A[n] in Step S93. That is, A2 >A1.

In Step S95 the amplitude A[n] may be found not greater than the threshold value 2. If so, the operation goes to Step S97. In Step S97, the value of time n is increased.

In Step S98, the calculator 20 determines again whether the value of time n is equal to the end time of the CM candidate. If NO, the operation returns to Step S91, in which the amplitude A[n] the audio signal has at present is obtained.

It is determined in Step S92 whether the flag F is has been set or not. The flag F is set in this case. Therefore, the operation advances to Step S95, in which whether the amplitude A[n] is greater than the threshold value 2 is determined. If NO, the operation proceeds to Step S97. Steps S97, S98, S91 to S95 are repeated.

If the amplitude A[n] is found less than the threshold value A1, the count of the counter C is increased by one and remains unchanged until the amplitude A[n] increases greater than the threshold value 2 that is a littler larger than the threshold value A1.

In Step 95, the amplitude A[n] may be found greater than the threshold value A2. In this case, the operation goes to Step S96, in which the flag F is reset. Thereafter, the operation advances to Step S97, in which the value of time n is increased. Then, in Step S98, it is determined whether or not time n coincides with the end time of the CM candidate. If NO in Step S98, the operation returns to Step S91. Thus, Steps S91 to S97 are repeated.

If it is determined in Step S98 that the time n coincides with the end time of the CM candidate, the operation is terminated.

As indicated above, the threshold value 2 that is compared with the amplitude A[n] in Step S95 is greater than the threshold value A1 that is compared with the amplitude A[n] in Step S93. Hence, so-called hysteresis is applied to the process of determining the amplitude A[n]. In other words, the amplitude A[n] is regarded as a small one when it is less than the threshold value A1, and still considered small even if it grows a little larger than the threshold value A1. It is regarded as no longer a small one when it becomes larger than the threshold value, A2 that is greater than the threshold value A1. This prevents the number of small amplitudes from becoming too large, even if the amplitude A[n] changes, though only a little, during a small-amplitude period.

The number of small amplitudes, present in the CM candidate, is set in the counter C. The count of the counter C is output as a characteristic data item $Q_{16}$.

Figure 19A:
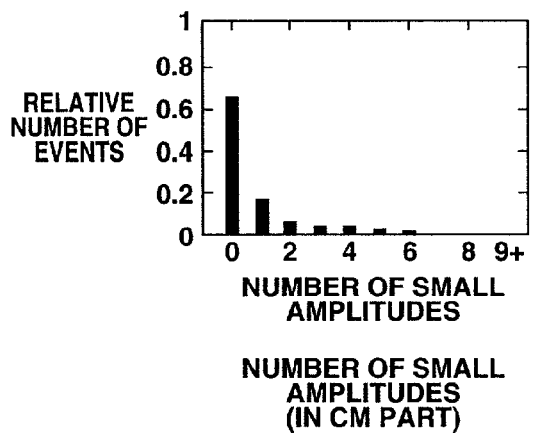
FIGS. 19A and 19B are diagrams showing the numbers of small amplitudes, actually obtained in the third embodiment.
Figure 19B:
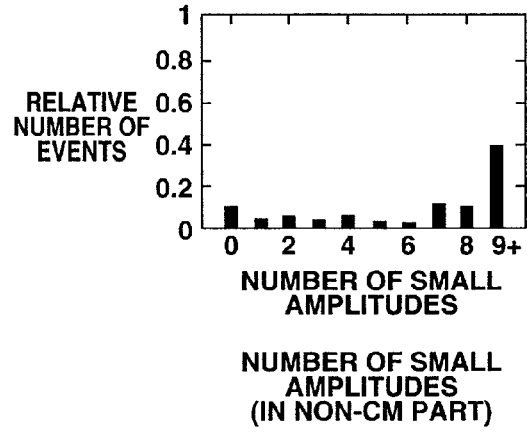
Figure 20:
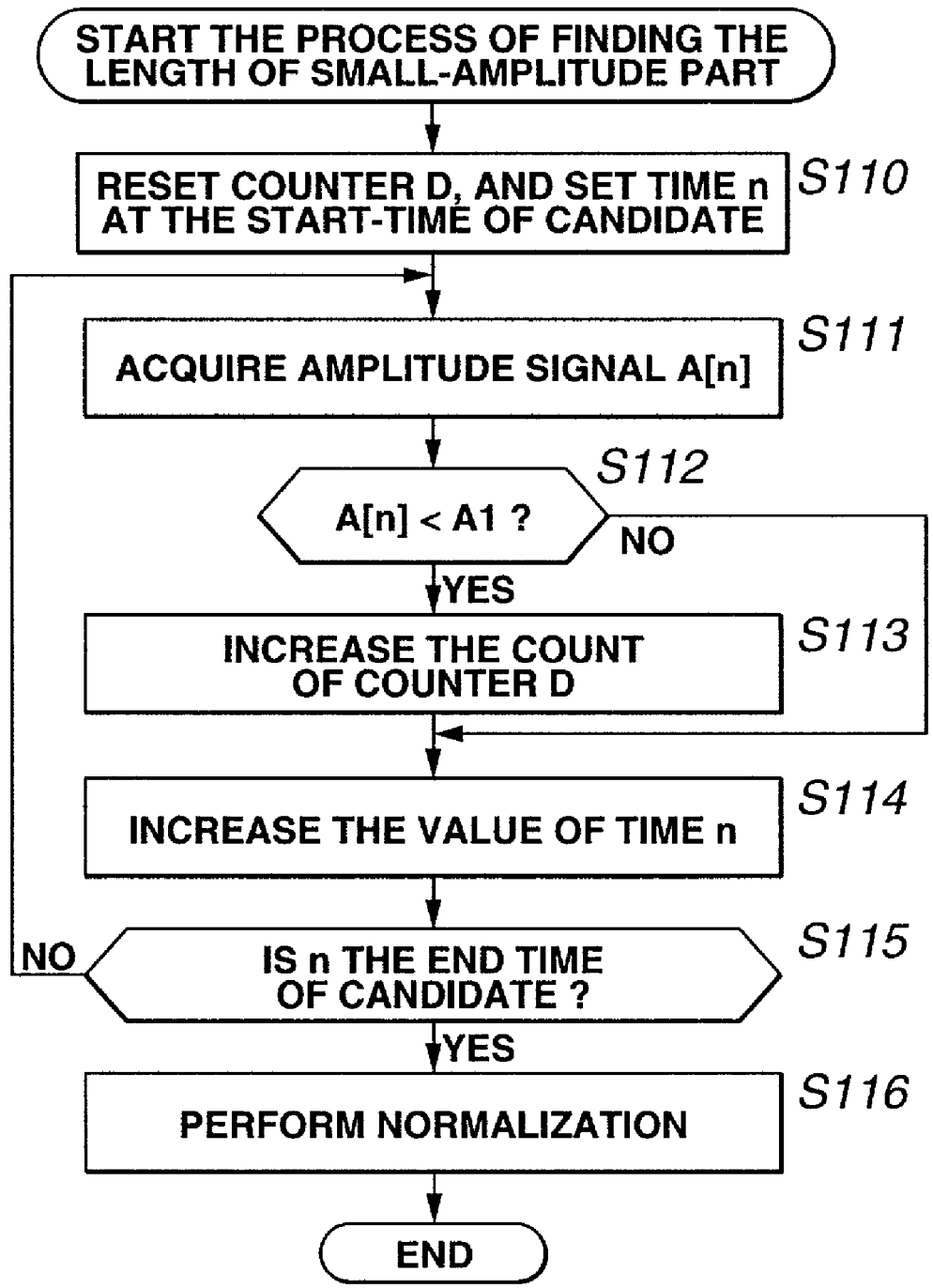
FIG. 20 is a flowchart explaining how the additional condition calculator provided in the CM-detecting section finds the length of a small-amplitude period.

FIGS. 19A and 19B are graphs that show the numbers of small amplitudes, actually obtained in the third embodiment. In FIGS. 19A and 19B, the number of small amplitudes is plotted on the abscissa, and the relative number of events on the ordinate. The graph of FIG. 19A represents the distribution of 352 CMs that were detected among 490 CM candidates. The graph of FIG. 19B illustrates the distribution of the remaining 138 CM candidates that were not CMs. In other words, FIG. 19B shows those parts of a TV program which were detected as CM candidates because they happened to satisfy the sound-value condition and image condition.

As seen form FIG. 19A, a small amplitude occurs zero to two times for most CM parts. By contrast, a small amplitude occurs more frequently for a non-CM part, seven to. nine times as is shown in FIG. 19B.

How the additional condition calculator 20 calculates the length of a small-amplitude period. First, the calculator 20 resets the count of a counter D, which indicates the small-amplitude period, in Step S110. Further, the calculator 20. sets the value of time n at the end time of a CM candidate.

In Step S111, the additional condition calculator 20 acquires the amplitude A[n] of an audio signal. In Step S112, it is determined whether the amplitude A[n] acquired at Step S111 is less than a prescribed threshold value A1. The threshold value A1 is equal to the value A1 applied in Step S93 shown in FIG. 18. Alternatively, it may be different therefrom.

In Step S112 the amplitude A[n] may be found equal to or greater than the threshold value A1. If so, the operation advances to Step S114, in which the value of time n is increased. Then, in Step S115, the calculator 20 determines whether the value of time n, thus increased, coincides with the end time of a CM candidate. If NO, the operation returns to Step S111, in which the calculator obtains the amplitude A[n] the audio signal has at present.

In Step S112 it is determined again whether the amplitude A[n] is less than the threshold-value A1 or not. If the amplitude A[n] is not less than the value A1, the operation goes to Step A114. In Step S114, the value of time n is increased further.

If the additional condition calculator 20 determines in Step S112 that the amplitude A[n] is equal to or greater than the threshold value A1, the operation proceeds to Step S113. In Step S113, the count of the counter D is increased by one. By Thereafter, the operation advances to Step S114. In Step S114, the value of the time n is increased. In Step S115, it is determined whether the value of time n coincides with the end time of the CM candidate. If NO, the operation returns to Step S111, in which the amplitude A[n] the audio signal has at present is obtained. Then, in Step S112, the calculator 20 determines again whether the amplitude A[n] is less than the threshold value A1. If the amplitude A[n] is less than the value A1, the operation goes to Step S113. In Step S113, the count of the counter D is increased by one.

The sequence of the steps mentioned above is repeated until the count of the counter D comes to represent a period during which the amplitude A[n] remains less than the threshold value A1.

In Step S115 the additional condition calculator 20 may determine that the value of time n coincides with the end time of the CM candidate. If so, the operation advances to Step S116. In Step S116, the count of the counter D is normalized.

In other words, the count of the counter D is divided by a sampling frequency $f_s$. The count thus normalized is output as a characteristic data item $Q_{17}$.

Figure 21A:
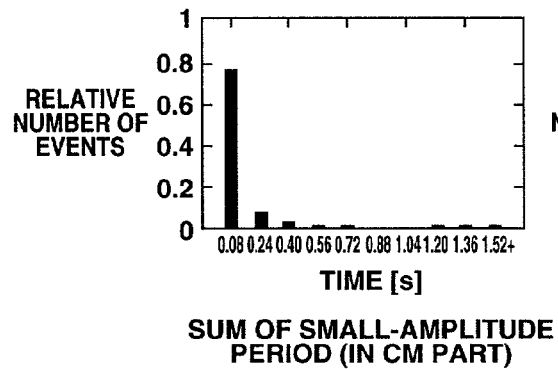
FIGS. 21A and 21B are diagrams showing the suns of small-amplitude periods, actually obtained in the third embodiment.
Figure 21B:
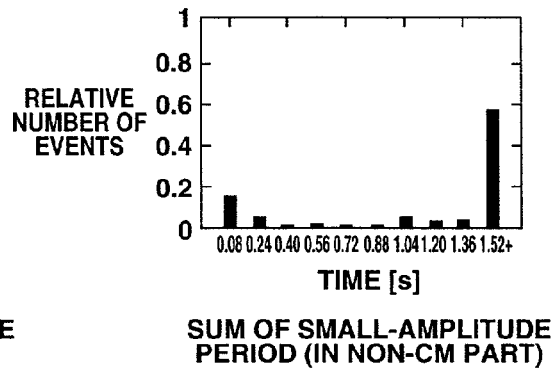

Like FIGS. 19A and 19B, FIGS. 21A and 21B are graphs that show the sums of small-amplitude periods, which were actually obtained. More specifically, FIG. 19A represents the sum of small-amplitude periods for 352 CMs that were detected among 490 CM candidates. FIG. 19B illustrates the sum of small-amplitude periods for the remaining 138 CM candidates that were not CMs. In FIGS. 21A and 21B, the sum of small-amplitude periods is plotted on the abscissa, and the relative number of events on the ordinate. As seen form FIG. 21A, the sum of small-amplitude periods is 20 ms or less for most CM parts. By contrast, the sum of small-amplitude periods is 1.0 s or more for most non-CM part, as is seen from FIG. 21B.

The additional condition calculator 20 calculates the amplitude dispersion of the audio signal in accordance with the following equation (29).

$$v = \frac{1}{e-s}\sum_{n=s}^{e-1} A^2[n] - \left(\frac{1}{e-s}\sum_{n=s}^{e-1} A[n]\right)^2 \qquad (29)$$

where s is the start time of converting the audio signal to discrete values, e is the end time of converting the audio signal to discrete values, and v is the dispersion of the audio signal.

The additional condition calculator 20 outputs the value v or the square root thereof, as a characteristic data item $Q_{18}$. Alternatively, the calculator 20 divides the standard deviation by the average of the value v, thus outputting the relative standard deviation as characteristic data item $Q_{18}$.

Figure 22A:
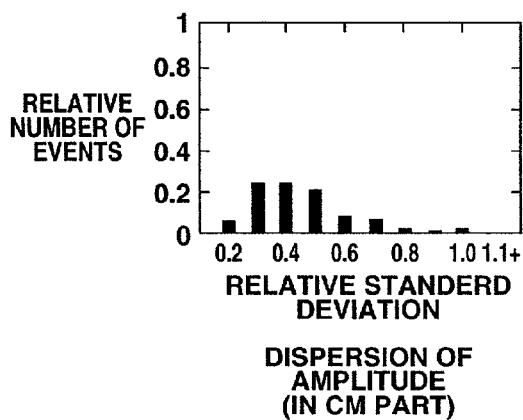
FIGS. 22A and 22B are diagrams, each illustrating the dispersion of amplitude.
Figure 22B:
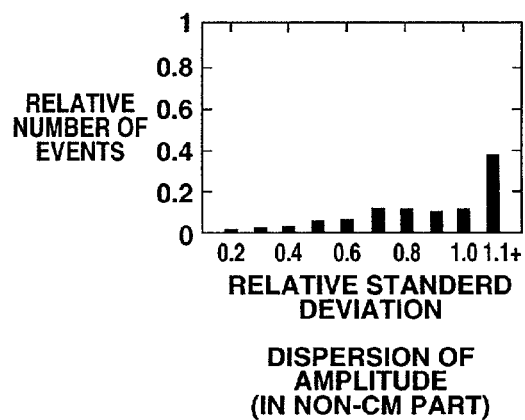

FIGS. 22A and 22B illustrate two types of amplitude dispersions. To be more specific, FIG. 22A shows the amplitude dispersion observed of the 352 CMs that were detected among 490 CM candidates. FIG. 22B shows the amplitude dispersion observed of the remaining 138 CM candidates that were not CMs. Note that, in FIGS. 22A and 22B, the number of small amplitudes is plotted on the abscissa, and the relative number of events on the ordinate.

As can be understood from FIGS. 22A and 22B, the relative standard deviation is 0.6 or less for most CM parts. By contrast, the relative standard deviation is 0.7 or more for many non-CM part, as is seen from FIG. 22B.

The CM-detecting section 4, i.e., the third embodiment of the invention, can therefore detect CMs more reliably since it uses the number of small amplitudes, the length of each small-amplitude period and the amplitude dispersion, as characteristic data items.

A video-audio recorder according to the fourth embodiment of the present invention will be described below.

Figure 23:
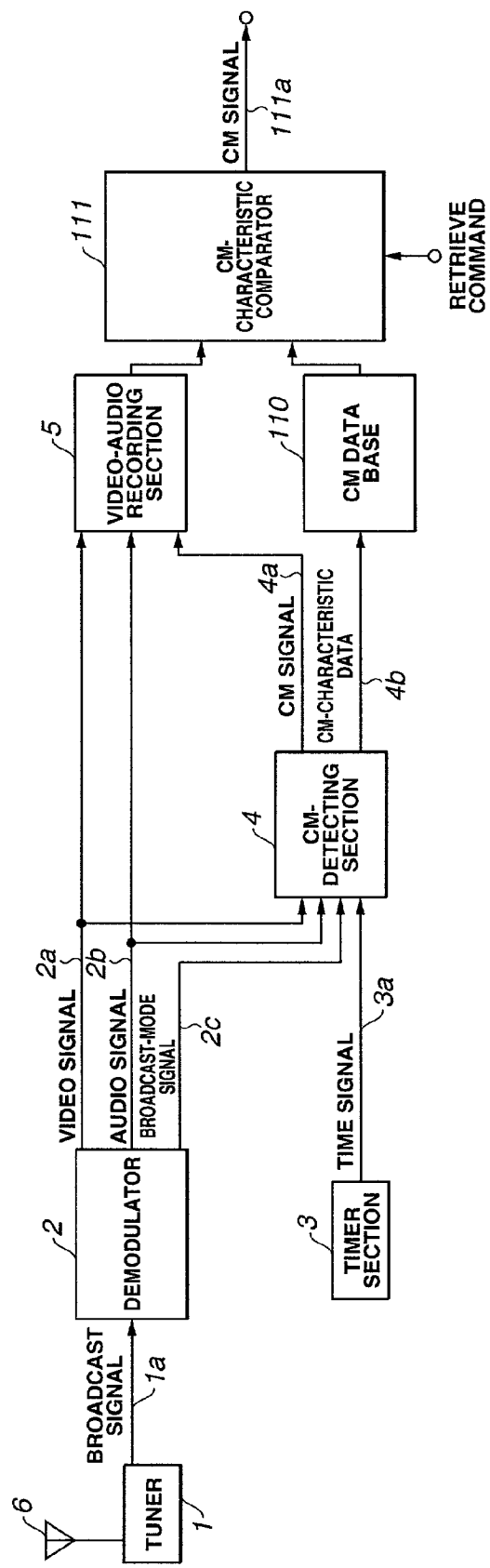
FIG. 23 is a block diagram illustrating another video-audio recorder according to the present invention.

FIG. 23 shows the video-audio recorder, i.e., the fourth embodiment of the invention.

The components identical in fiction to those shown in FIG. 1 are denoted at the same reference numerals in FIG. 23 and will not described in detail. The fourth embodiment can use the first, second and third embodiments as a CM-detecting section 4.

The fourth embodiment differs from the video-audio recorder shown in FIG. 1, in two respects. First, it comprises two additional components, i.e., a CM database 110 and a CM-characteristic comparator 111. Second, its CM-detecting section 4 has additional functions.

The CM-detecting section 4 provided in the fourth embodiment generates the characteristic data G[n] expressed by the equation (10). The CM-detecting section 4 can output the start time and end time of a CM and the data G[n] about the start frame n ($=n_s$) to end frame n ($=n_e$), to a CM database 110.

The CM database 110 stores the start time, length and characteristic data G[n] of the CM detected by the CM-detecting section 4.

The CM-characteristic comparator 111 receives a retrieve command the user has input and designating a CM. In response to the retrieve command the CM-characteristic comparator 111 selects the CM from all or some of the CMs stored in the database 110. The comparator 111 outputs the CM in the form of a CM signal 111a.

Figure 24:
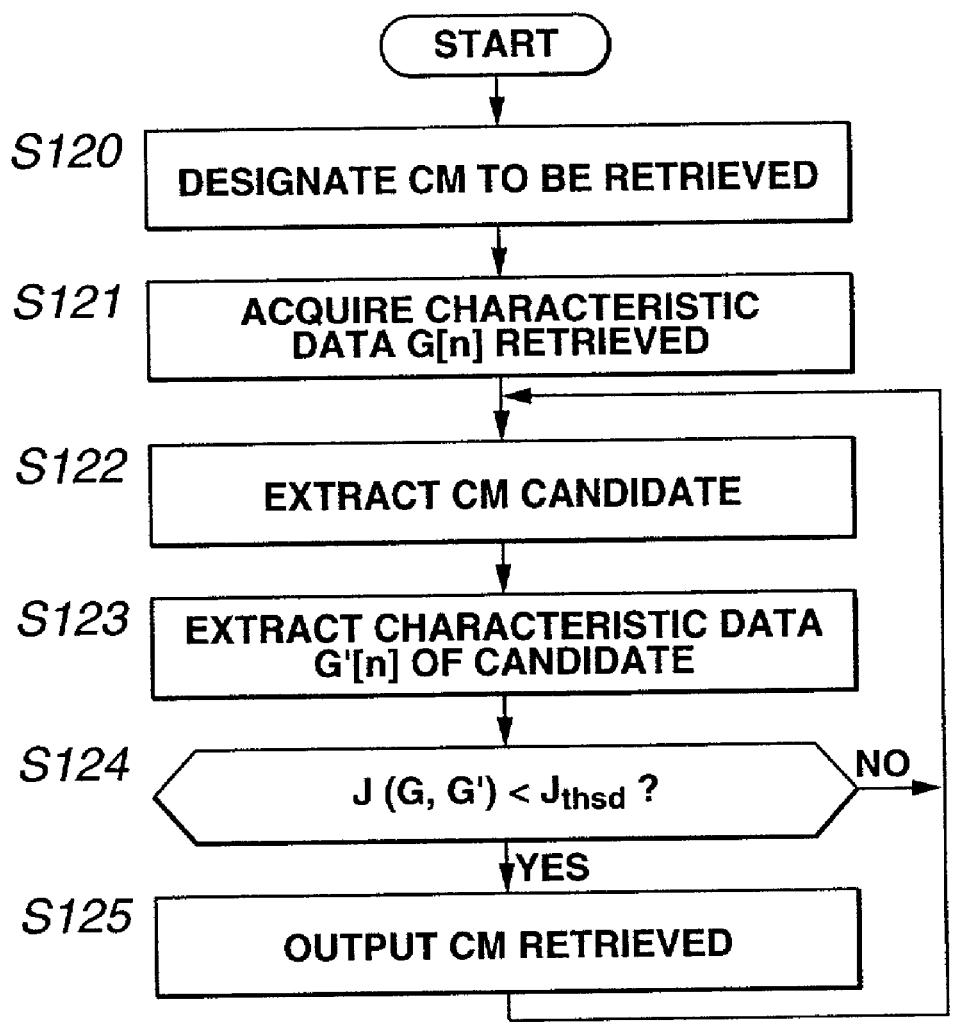
FIG. 24 is a flowchart explaining the operation of the CM-characteristic comparator incorporated in the recorder shown in FIG. 23.

The operation of the CM-characteristic comparator 111 will be explained, with reference to FIG. 24.

Assume that the user who has enjoyed a program stored in the video-audio recording section 5 wishes to see a CM contained in that program. The user therefore selects the CM so that the CM may be retrieved from the CM database 110. Thus, a retrieve command is input in Step S120, designating the CM.

In Step S121, the CM-characteristic comparator 111 acquires the characteristic data G[n] about the CM from the CM database 110, in response to the retrieve command.

In Step S122, the CM-characteristic comparator 111 extracts one of the CM candidates from the CM database 110. In Step S123, the comparator 111 acquires the characteristic data G'[n] about the CM candidate extracted.

In Step S124, the CM-characteristic comparator 111 carries out the calculation of the following equation (30), thereby comparing the data G'[n] with a prescribed threshold value $J_{thsd}$:

$$J(G, G') = \sum_{R} |G[n] - G[n']|^2 \qquad (30)$$

In Step S124 the value J (G, G') may be found to be smaller than the threshold value $J_{thsd}$. If so, the comparator 111 determines that the characteristic data G'[n] is the same as the characteristic data G[n] and advances to Step S125. In Step S125, the comparator 111 outputs the CM thus retrieved from the database 110. If the value J (G, G') is not found smaller than the threshold value $J_{thsd}$ in Step S124, the comparator 111 returns to Step S122. In this case, Steps S122 to S124 are repeated for the next CM candidate.

Thus, the CM-characteristic comparator 111 can retrieve, from the video-audio recording 5, the same CM that the user has designated.

Figure 25:
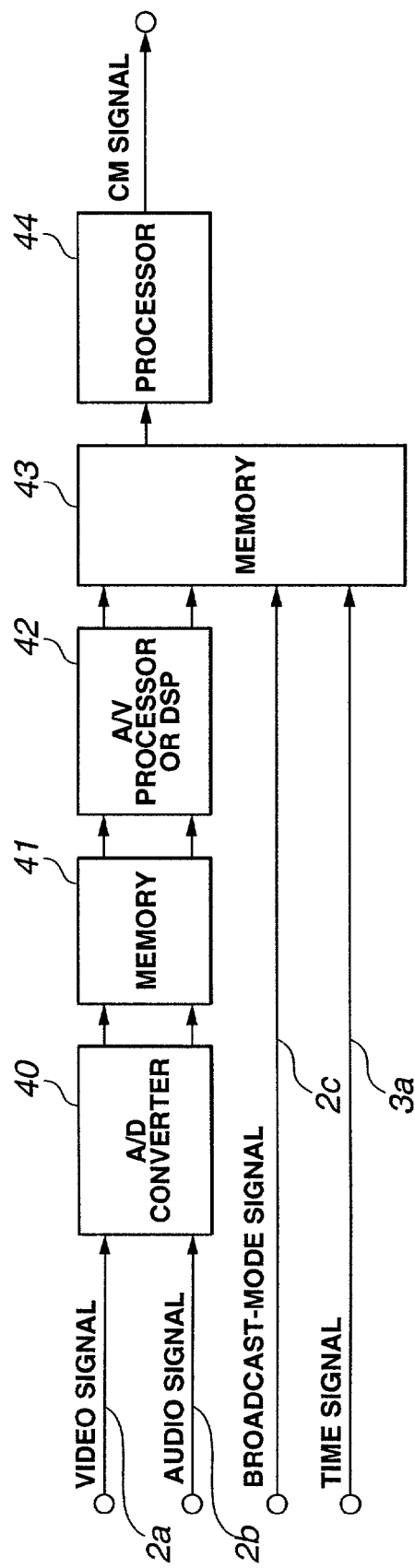
FIG. 25 is a block diagram depicting the CM-detecting section incorporated in the video-audio recorder shown in FIG. 23.

FIG. 25 is a block diagram depicting the CM-detecting section 4 incorporated in the video-audio recorder shown in FIG. 23.

As shown in FIG. 25, the CM-detecting section 4 has an A/D converter 40 and a memory 41. The A/D converter 40 performs the same fiction as the A/D converters 10 and 13 that are shown in FIGS. 2 and 15, respectively. The memory 41 performs the functions of the frame memory 11 and audio signal buffer 14, both described above.

The CM-detecting section 4 further comprises an A/V processor or DSP (Digital Signal Processor) 42, a memory 43. The A/V processor or DSP 42 performs the functions of the cut-change detector 12, amplitude detector 15, correlation detector 16, spectrum detector 17 and sound source discriminator 101 and, the memory 43 performs the function of the characteristic buffer 18, which have been described above.

The processor 44 performs the functions of the CM-candidate detector 19, additional condition calculator 20, additional condition analyzer 21, rule analyzer 22 and CM-probability database 103, all described above.

Either the A/V processor (or DSP) 42 or the processor 44 performs the function of the control section 23 described above.

As has been described, with the embodiments of the invention it is possible to detect CM parts from a TV-broadcast signal with high accuracy. The embodiments are therefore convenient not only to those who do not wish to see CMs, but also to those who like to see CMs. More precisely, the invention can provide an apparatus that skips CM parts from the TV-broadcast signal, thus reproducing only the program proper, for people who wish to enjoy only the program proper. The invention can provide an apparatus, too, which extracts from the TV-broadcast signal only the CM part designated by the user, thereby reproducing only the CM for people who want to see the CM only.

Since the invention can reliably detect CM parts from any TV-broadcast signal, it is useful, and helpful for those who investigate when and how specific CMs are actually broadcast.

What is claimed is:

1. A signal-processing apparatus comprising:
    a candidate-detecting unit which receives an input signal part from an input signal in time-divided fashion, and identifies characteristic patterns in a portion of the input signal part indicating the probability that the input signal part is a candidate part;
    a characteristic-extracting unit which extracts characteristic patterns from the input signal part which alone indicate the probability that the input signal part is the candidate part; and
    a detecting unit which detects whether the input signal part is the candidate part based on the characteristic data extracted by the characteristic-extracting unit; and
    a determining unit which determines whether the candidate part resulting from the extraction and detection performed by the characteristic-extracting unit and the detecting unit is a commercial message,
    wherein,
        the determining unit determines whether the candidate part is a commercial message by first applying a minimum-length priority rule and then applying an adjacent-candidate priority rule based on the result of the minimum-length priority rule and then applying a score priority rule based on the result of die adjacent-candidate priority rule.

2. The signal-processing apparatus according to claim 1, wherein:
    the detecting unit includes a determining unit which determines, from the extracted characteristic data, if the input signal part is identical to a previously designated input signal part.

3. The signal-processing apparatus according to claim 1, wherein:
    the apparatus further comprises an amplitude-detecting unit which detects an amplitude of the input signal, and
    detected amplitudes of the input signal smaller than a predetermined value at a predetermined interval are extracted by the character-extracting unit as a characteristic pattern indicating the probability that the input signal part is the candidate part.

4. The signal-processing apparatus according to claim 1, wherein:
    the candidate detecting unit further comprises a change-detecting unit which detects a change in the input signal, and
    detected changes in the input signal greater than a predetermined value at a predetermined time interval are extracted by the character-extracting unit as a characteristic pattern indicating the probability that the input signal part is the candidate part.

5. The signal-processing apparatus according to claim 1, wherein:
    the candidate detecting unit further comprises a uniform-component detecting unit which detects a unit period in which a prescribed component of the input signal falls within a prescribed range, and
    prescribed components of the input signal for the unit period at predetermined time intervals are extracted by the character-extracting unit as a characteristic pattern indicating the probability that the input signal part is the candidate part.

6. The signal-processing apparatus according to claim 1, wherein:
    the detecting unit includes an amplitude-detecting unit which detects an amplitude of the input signal, and
    the character-extracting unit extracts the amplitude detected by the amplitude-detecting unit as characteristic data indicating the probability that the input signal part is the candidate part.

7. The signal-processing apparatus according to claim 1, wherein:
    the detecting unit includes an amplitude-detecting unit which detects an amplitude of the input signal, and
    the characteristic-extracting unit extracts the length of the input signal part as characteristic data indicating the probability that the input signal part is the candidate part, where the amplitudes of another signal part preceding or following the input signal part are smaller than a predetermined threshold.

8. The signal-processing apparatus according to claim 1, wherein:
    the detecting unit includes a correlation-detecting unit which detects the correlation between a left and a right audio portion of the input signal part, and
    the characteristic-extracting unit extracts a correlation coefficient from the input signal part as characteristic data indicating the probability that the input signal part is the candidate part.

9. The signal-processing apparatus according to claim 1, wherein:
    the detecting unit includes an amplitude-detecting unit which detects an amplitude of the input signal part, and
    the characteristic-extracting unit extracts a mean of the amplitude in the input signal part as characteristic data indicating the probability that the input signal part is the candidate part.

10. The signal-processing apparatus according to claim 1, wherein:
    the detection unit includes a change-detecting unit which detects a change in the input signal part, and
    the characteristic-extracting unit extracts the number of times the input signal part sharply changes as characteristic data indicating the probability that the input signal part is the candidate part.

11. The signal-processing apparatus according to claim 1, wherein:
    the detecting unit includes a uniform-component detecting unit which detects a unit period during which a prescribed component of the input signal part is uniform, and
    the characteristic-extracting unit extracts the number of times the prescribed component of the input signal part becomes uniform as characteristic data indicating the probability that the input signal part is the candidate part.

12. The signal-processing apparatus according to claim 1, wherein:
the detecting unit includes a mode-detecting unit which detects a mode of the input signal part, and
the characteristic-extracting unit extracts the mode of the input signal part as characteristic data indicating the probability that the input signal part is the candidate part.

13. The signal-processing apparatus according to claim 1, wherein:
the characteristic-extracting unit extracts the existence of the candidate part in another signal that precedes or follows the input signal part as characteristic data indicating the probability that the input signal part is the candidate part.

14. The signal-processing apparatus according to claim 1, wherein:
the detecting unit includes a spectrum-detecting unit which detects a spectrum of the input signal part, and
the characteristic-extracting unit extracts a change in the spectrum before or after the input signal part as characteristic data indicating the probability that the input signal part is the candidate part.

15. The signal-processing apparatus according to claim 1, wherein:
the characteristic-extracting unit extracts channel information from the input signal part as characteristic data indicating the probability that the input signal part is the candidate part.

16. The signal-processing apparatus according to claim 1, wherein:
the characteristic-extracting unit extracts an area code from the input signal part as characteristic data indicating the probability that the input signal part is the candidate part.

17. The signal-processing apparatus according to claim 1, wherein:
the characteristic-extracting unit includes a signal-identifying unit which identifies a source of the input signal part, and
the characteristic extracting unit extracts the source of the input signal part as characteristic data indicating the probability that the input signal part is the candidate part.

18. The signal-processing apparatus according to claim 1, wherein:
the apparatus includes a timer which measures time, and
the characteristic-extracting unit extracts the time at which the input signal part is input as characteristic data indicating the probability that the input signal part is the candidate part.

19. The signal-processing apparatus according to claim 1, wherein:
the detecting unit includes a genre-identifying unit which identifies a genre of the input signal, and
the characteristic-extracting unit extracts the genre from the signal parts preceding and following the input signal part as characteristic data indicating the probability that the input signal part is the candidate part.

20. The signal-processing apparatus according to claim 1, wherein:
the detecting unit includes a timer for measuring time and a genre-identifying unit for identifying a genre of the input signal part, and
the characteristic-extracting unit extracts the genres from other signal parts preceding and following the input signal part and the time that has lapsed from the time of inputting the input signal part as characteristic data indicating the probability that the input signal part is the candidate part.

21. The signal-processing apparatus according to claim 1, wherein:
the characteristic-extracting unit extracts the number of times the amplitude of the input signal is smaller than a threshold value or the length of the input signal or the dispersion of amplitude of the input signal as characteristic data indicating the probability that the input signal part is the candidate part.

22. The signal-processing apparatus according to claim 1, further comprising a unit for recording and/or reproducing the input signal.

23. The signal-processing apparatus according to claim 1, further comprising a unit for editing the input signal.

24. The signal-processing apparatus according to claim 1, further comprising a unit for skipping the input signal part.

25. The signal-processing apparatus according to claim 1, further comprising a unit for extracting only the input signal part.

26. The signal-processing apparatus according to claim 1, wherein:
the input signal consists of an audio signal or a video signal, and the input signal part is a commercial message part.

27. A signal-processing apparatus including a memory and processor which performs a method including the steps of:
receiving an a input signal part and other signal parts from an input signal in time-divided fashion; and
detecting from the input signal a candidate part from the input signal part in accordance with characteristic patterns of the input signal part;
extracting characteristic patterns from the input signal part which alone indicate the probability that the input signal part is the candidate part; and
detecting the candidate part in accordance with the extracted characteristic data;
determining whether the candidate part is a commercial message by first applying a minimum-length priority rule, and then applying an adjacent-candidate priority rule based on the result of the minimum-length priority rule and then applying a score priority rule based on the result of the adjacent-candidate priority rule.

28. The signal-processing apparatus according to claim 27, wherein:
the characteristic data indicates that the signal in the candidate part is identical to the input signal part which has been designated.

29. The signal-processing apparatus according to claim 27, wherein:
an amplitude pattern of the input signal smaller than a predetermined value at a predetermined time interval is detected as a characteristic pattern.

30. The signal-processing method-apparatus according to claim 27, wherein:
a change of the input signal greater than a predetermined value at predetermined time intervals is detected as a characteristic pattern.

31. The signal-processing apparatus according to claim 27, wherein:
a prescribed component of the input signal which falls within a prescribed range during a unit period and at a predetermined time interval is detected as a characteristic pattern.

32. The signal-processing apparatus according to claim 27, wherein:

the amplitude of the signal parts preceding or following the input signal part are extracted as characteristic data indicating the probability that the input signal part is the candidate part.

33. The signal-processing apparatus according to claim 27, wherein:

the signal parts and the amplitudes of the signal parts preceding or following the input signal part which are smaller than a predetermined threshold are extracted as characteristic data indicating the probability that the input signal part is the candidate part.

34. The signal-processing apparatus according to claim 27, wherein:

the correlation of a left and right audio portion of the input signal part is extracted as characteristic data indicating the probability that the input signal part is the candidate part.

35. The signal-processing apparatus according to claim 27, wherein:

a mean amplitude in the input signal part is extracted as characteristic data indicating the probability that the input signal part is the candidate part.

36. The signal-processing apparatus according to claim 27, wherein:

the number of times the input signal sharply changes in the input signal part is extracted as characteristic data indicating the probability that the input signal part is the candidate part.

37. The signal-processing apparatus according to claim 27, wherein:

the number of times which the prescribed component of the input signal becomes uniform in the input signal part is extracted as characteristic data indicating the probability that the input signal part is the candidate part.

38. The signal-processing apparatus according to claim 27, wherein:

a mode of the input signal is detected, and the mode of the input signal part is extracted as characteristic data indicating the probability that the input signal part is the candidate part.

39. The signal-processing apparatus according to claim 27, wherein:

the existence of the candidate part in a signal that precedes or follows the input signal part is extracted as characteristic data indicating the probability that the input signal part is the candidate part.

40. The signal-processing apparatus according to claim 27, wherein:

a spectrum of the input signal is detected, and a change in the spectrum before or after the input signal part is extracted and used as characteristic data indicating the probability that the input signal part is candidate the candidate part.

41. The signal-processing apparatus according to claim 27, wherein:

channel information of the input signal part is extracted as characteristic data indicating the probability that the input signal part is the candidate part.

42. The signal-processing apparatus according to claim 27, wherein:

an area code of the input signal part is extracted as characteristic data indicating the probability that the input signal part is the candidate part.

43. The signal-processing apparatus according to claim 27, wherein:

the source of the input signal part is extracted as characteristic data indicating the probability that the input signal part is the candidate part.

44. The signal-processing apparatus according to claim 27, wherein:

the time at which the input signal part is inputted is extracted as characteristic data indicating the probability that the input signal part is the candidate part.

45. The signal-processing apparatus according to claim 27, wherein:

the genres of the signal parts preceding and following the input signal part are extracted as characteristic data indicating the probability that the input signal part is the candidate part.

46. The signal-processing apparatus according to claim 27, wherein:

the genre of the signal parts preceding and following the input signal part and the time that has lapsed since the inputting of the input signal part are extracted as characteristic data indicating the probability that the input signal part is the candidate part.

47. The signal-processing apparatus according to claim 27, wherein:

the number of times the amplitude of the input signal is smaller than a threshold value, the length of the input signal, or the dispersion of amplitude of the input signal are extracted as characteristic data indicating the probability that the input signal part is the candidate part.

48. The signal-processing apparatus according to claim 1, wherein:

the detecting unit includes:
a characteristic-evaluating unit for evaluating the possibility that the input signal part is the candidate part on the basis of the characteristic data, and
a determining unit for determining the candidate part from the result of the evaluation performed by the characteristic-evaluating unit.

49. The signal-processing apparatus according to claim 48, wherein:

the characteristic-evaluating unit evaluates the possibility that the input signal part is the candidate part on the basis of characteristic data derived from multiplying weighting values to the characteristic data and adding the weighted characteristic data.

50. The signal-processing apparatus according to claim 48, wherein:

the characteristic-evaluating unit uses a multi-layer perception to determine the possibility that the input signal part is the candidate part.

51. The signal-processing apparatus according to claim 27, wherein:

the possibility that the input signal part is the candidate part is evaluated on the basis of the characteristic data in order to detect the candidate part, and the candidate part is determined from the result of evaluating the possibility.

52. The signal-processing apparatus according to claim 51, wherein:

the possibility that the input signal part is the candidate part is evaluated on the basis of characteristic data derived from multiplying weighing values to the characteristic data and adding the weighted characteristic data.

53. The signal-processing apparatus according to claim 51, wherein:

a multi-layer perception is used to determine the possibility that the input signal part is the candidate part.

* * * * *